US007870093B2

(12) United States Patent　　(10) Patent No.: US 7,870,093 B2
Eguchi et al.　　(45) Date of Patent: Jan. 11, 2011

(54) STORAGE SUBSYSTEM

(75) Inventors: Yoshiaki Eguchi, Yokohama (JP);
Yasutomo Yamamoto, Sagamihara (JP);
Hiroshi Arakawa, Sagamihara (JP);
Yusuke Hirakawa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 422 days.

(21) Appl. No.: 12/116,487

(22) Filed: May 7, 2008

(65) Prior Publication Data

US 2008/0250079 A1　　Oct. 9, 2008

Related U.S. Application Data

(63) Continuation of application No. 10/777,107, filed on Feb. 13, 2004, now Pat. No. 7,386,755.

(30) Foreign Application Priority Data

Feb. 3, 2004　(JP)　............................. 2004-026356

(51) Int. Cl.
*G06F 7/00*　(2006.01)
(52) U.S. Cl. ...................... 707/609; 709/212
(58) Field of Classification Search .................. 707/609
See application file for complete search history.

(56) References Cited

U.S. PATENT DOCUMENTS

| 5,263,154 | A | 11/1993 | Eastridge et al. |
| 5,485,608 | A | 1/1996 | Lomet et al. |
| 5,544,347 | A | 8/1996 | Yanai et al. |
| 5,742,792 | A | 4/1998 | Yanai et al. |
| 6,044,444 | A | 3/2000 | Ofek |
| 6,393,537 | B1 | 5/2002 | Kern |
| 6,393,538 | B2 | 5/2002 | Murayama |

(Continued)

FOREIGN PATENT DOCUMENTS

JP　　09-282211　　10/1997

(Continued)

OTHER PUBLICATIONS

Decision to Dismiss Amendment in Japanese Application No. 2004-026356, mailed Feb. 23, 2010 (with English translation).

*Primary Examiner*—Charles Rones
*Assistant Examiner*—Fazlul Quader
(74) *Attorney, Agent, or Firm*—Brundidge & Stanger, P.C.

(57) ABSTRACT

The data up to a point of time whereat failure has occurred will be restored at high speed at a remote site without imposing any burden on a host. The first storage system on the master side processes an I/O request from the host, and as a result of I/O processing to the second storage system on the remote side, transmits the update data. The second storage system retains data received from the first storage system as update log data. The host transmits a command for settling a state of an application to the first storage system as data, and the first storage system transmits the data to the second storage system. The host and the second storage system both retain an identifier corresponding to the command, and relate the identifier to the log data. Thereby, the host designates the identifier at any given time, whereby the second storage system restores the data at any given time.

10 Claims, 23 Drawing Sheets

U.S. PATENT DOCUMENTS

| | | |
|---|---|---|
| 6,397,229 B1 | 5/2002 | Menon et al. |
| 6,460,055 B1 | 10/2002 | Midgley et al. |
| 6,606,694 B2 | 8/2003 | Carteau |
| 6,658,590 B1 | 12/2003 | Sicola et al. |
| 6,671,705 B1 | 12/2003 | Duprey et al. |
| 6,691,245 B1 | 2/2004 | DeKoning |
| 6,732,123 B1 | 5/2004 | Moore et al. |
| 6,732,124 B1 | 5/2004 | Koseki et al. |
| 6,763,436 B2 | 7/2004 | Gabber et al. |
| 6,789,178 B2 | 9/2004 | Mikkelsen et al. |
| 6,981,177 B2 | 12/2005 | Beattie |
| 7,076,620 B2 | 7/2006 | Takeda et al. |
| 7,085,902 B2 | 8/2006 | Hayardeny et al. |
| 7,139,927 B2 | 11/2006 | Park et al. |
| 2003/0131109 A1* | 7/2003 | Rosensteel et al. .......... 709/227 |
| 2003/0145179 A1 | 7/2003 | Gabber |
| 2004/0193658 A1* | 9/2004 | Kawamura et al. .......... 707/202 |
| 2004/0193945 A1* | 9/2004 | Eguchi et al. .................. 714/6 |

FOREIGN PATENT DOCUMENTS

| | | |
|---|---|---|
| JP | 2001-216185 | 8/2001 |
| JP | 2001-273242 | 10/2001 |

\* cited by examiner

FIG. 4

STORAGE MANAGEMENT INFORMATION 115

IDENTIFIER OF HOST COMPUTER : XXXXXXX

| ADDRESS OF STORAGE UNIT WHICH HOST COMPUTER RECOGNIZES ~301 | | LOGICAL ADDRESS WITHIN STORAGE SYSTEM ~302 | |
|---|---|---|---|
| IDENTIFIER OF STORAGE UNIT ~303 | ADDRESS WITHIN STORAGE UNIT ~304 | LOGICAL STORAGE NUMBER WITHIN STORAGE SYSTEM ~305 | ADDRESS WITHIN LOGICAL STORAGE NUMBER WITHIN STORAGE SYSTEM ~306 |
| aaaaaaaaaaaaa | 0000000000000 | 00 | 0000000000000 |
| aaaaaaaaaaaab | 0000000000000 | 0B | 0000000000000 |
| aaaaaaaaaaaab | 1000000000000 | 0C | 0000000000000 |
| ...... | ...... | ...... | ...... |

F I G. 5

STORAGE MANAGEMENT INFORMATION 116

| LOGICAL ADDRESS WITHIN STORAGE SYSTEM ~401 | | ADDRESS CONCERNING RAID GROUP ~402 | | ADDRESS CONCERNING DISK ~403 | |
|---|---|---|---|---|---|
| LOGICAL STORAGE NUMBER WITHIN STORAGE SYSTEM ~404 | ADDRESS WITHIN LOGICAL STORAGE NUMBER WITHIN STORAGE SYSTEM | RAID GROUP NUMBER ~406 | VIRTUAL ADDRESS WITHIN RAID GROUP ~407 | DISK NUMBER ~408 | DISK ADDRESS ~409 |
| | ~405 | | | | |
| 00 | 000000000000 | 00 | 000000000000 | 00 | 000000000000 |
| 00 | 000002000000 | 00 | 000002000000 | 01 | 000002000000 |
| ... | ... | ... | ... | ... | ... |

FIG. 6

VOLUME CONFIGURATION INFORMATION 117, 152

| LOGICAL STORAGE NUMBER WITHIN STORAGE SYSTEM 501 | Host Type 502 | PASS DEFINITION 503 | STATE 504 | RESERVE INFORMATION 505 | Pair NUMBER 506 | LOG VOLUME GROUP NUMBER 507 | CAPACITY 508 |
|---|---|---|---|---|---|---|---|
| | | | | | | | |
| | | | | | | | |
| | | | | | | | |

FIG. 7

Pair MANAGEMENT INFORMATION 118, 153

| Pair NUMBER 601 | LOGICAL STORAGE NUMBER WITHIN STORAGE SYSTEM 3 (ORIGINAL) 602 | LOGICAL STORAGE NUMBER WITHIN STORAGE SYSTEM 4 (DUPLICATE) 603 | STATE 604 |
|---|---|---|---|
| | | | |
| | | | |
| | | | |

FIG. 8

Log Volume Group CONFIGURATION INFORMATION 154

| | |
|---|---|
| FLAG | ~701 |
| Log Volume Group NUMBER : xxx | ~702 |
| LOGICAL STORAGE NUMBER : yy | ~703 |
| SUM TOTAL OF LOGICAL STORAGE CAPACITY WITHIN Log Volume Group : zzz | ~704 |

| LOGICAL STORAGE NUMBER WITHIN STORAGE SYSTEM ~705 | Host Type ~706 | STATE ~707 | CAPACITY ~708 |
|---|---|---|---|
| - - - - - - - - - | - - - - - - - - - | - - - - - - - - - | - - - - - - - - - |

| | |
|---|---|
| NUMBER OF LOGICAL STORAGE IDENTIFIERS OF VOLUME FOR LOG TO BE USED IN Log Volume Group | ~709 |
| SUM OF CAPACITIES OF LOGICAL STORAGES OF VOLUME FOR LOG TO BE USED IN Log Volume Group | ~710 |

| LOGICAL STORAGE NUMBER WITHIN STORAGE SYSTEM ~711 | Host Type ~712 | STATE ~713 | CAPACITY ~714 |
|---|---|---|---|
| - - - - - - - - - | - - - - - - - - - | - - - - - - - - - | - - - - - - - - - |

FIG. 9

Volume Pool CONFIGURATION INFORMATION

| LOGICAL STORAGE NUMBER WITHIN STORAGE SYSTEM 801 | Host Type 802 | STATE 803 | RESERVE INFORMATION 804 | CAPACITY 805 |
|---|---|---|---|---|
| | | | | |
| | | | | |
| | | | | |

Log Volume Group QUANTITY CONSUMED MANAGEMENT INFORMATION 155

| Log Volume Group NUMBER | | | | ~901 |
|---|---|---|---|---|
| FULL FREE CAPACITY WITHIN Log Volume Group | | | | ~902 |
| LOGICAL STORAGE NUMBER WITHIN STORAGE SYSTEM ~903 | CAPACITY 904 | Write I/O AREA CAPACITY 905 | REMAINING CAPACITY 906 | RATIO OF REMAINING CAPACITY 907 |
| | | | | |
| | | | | |
| | | | | |

USAGE MONITOR INFORMATION 23     908

FIG. 11

LOG ID MANAGEMENT INFORMATION 157

| OLDEST LOG Data ID | 1001 |
|---|---|
| TIME PERIOD OF OLDEST LOG Data | 1002 |
| ADDRESS OF OLDEST LOG Data | 1003 |
| MOST RECENT LOG Data ID | 1011 |
| TIME PERIOD OF MOST RECENT LOG Data | 1012 |
| ADDRESS OF MOST RECENT LOG Data | 1013 |

FIG. 12

MARK ID MANAGEMENT INFORMATION 158

| OLDEST MARK ID | 1101 |
|---|---|
| TIME PERIOD OF OLDEST MARK | 1102 |
| ADDRESS OF OLDEST MARK | 1103 |
| MOST RECENT MARK ID | 1111 |
| TIME PERIOD OF MOST RECENT MARK | 1112 |
| ADDRESS OF MOST RECENT MARK | 1113 |

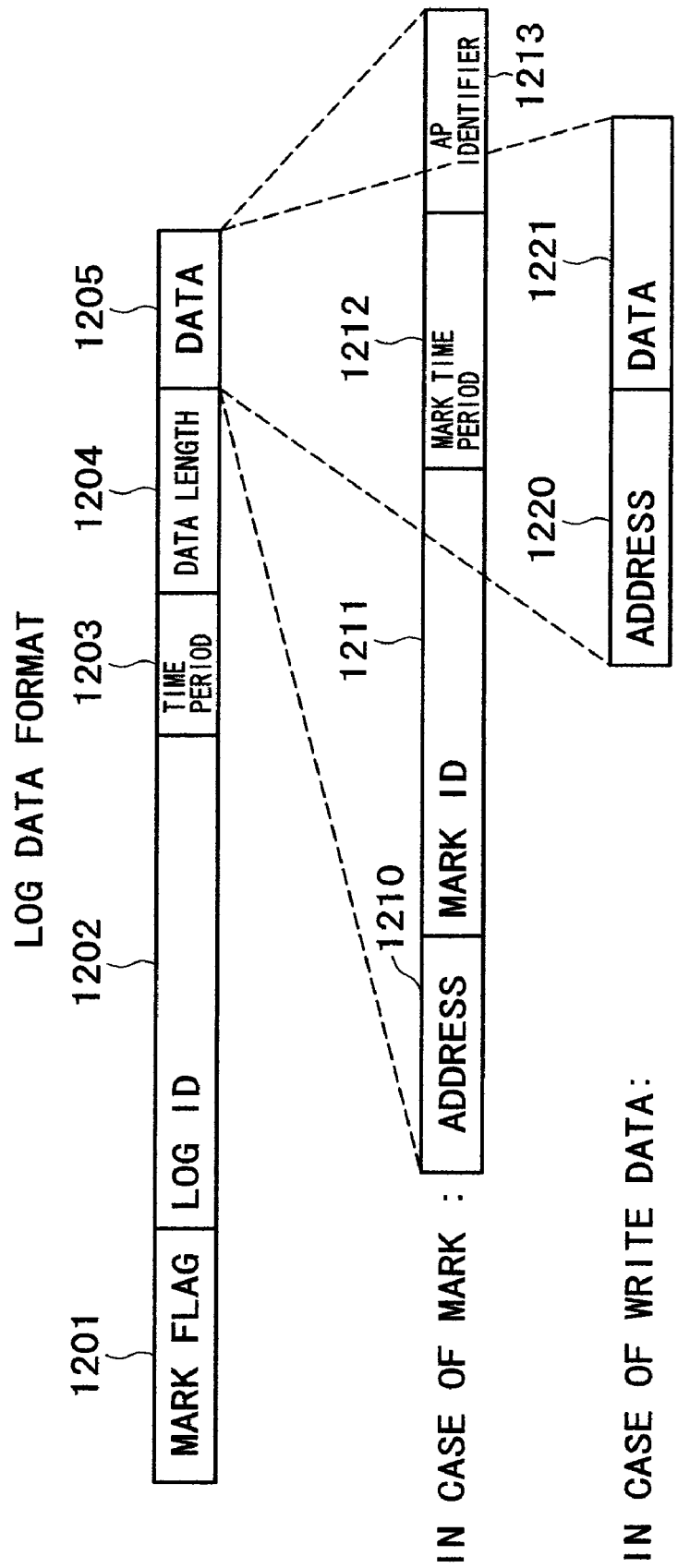

MARK COMMAND PROCESSING (MASTER SIDE)

COMAND PROCESSING (REMOTE SIDE)

STORAGE SUBSYSTEM

This application is a continuation application of U.S. application Ser. No. 10/777,107, filed Feb. 13, 2004, now U.S. Pat. No. 7,386,755, the entirety of which is incorporated herein by reference.

BACKGROUND OF THE INVENTION

1. Field of the Invention

The present invention relates to a storage subsystem, and more particularly to remote copying of a storage subsystem for acquiring a write I/O log and a method of restoring a log during a disaster.

2. Description of the Prior Arts

A computer system has become commercially practical in which a computer and a storage system are connected together through a network, and data to be processed by the computer is transmitted and received via the network and is stored in the storage system. In online processing and batch processing that are to be carried out by the computer system, there may enter a situation in which these processing abnormally terminates by program bugs, failure of the storage system and the like to cause contradictions in the data stored in the storage system. Also, the data stored in the storage system may be erased by an artificial mistake.

In order to recover data of the computer system which has entered such a state, there is known a data recovery technique by way of backup and restoration of data as one of techniques for resuming processing suspended halfway by getting rid of the data contradiction, or doing over the processing suspended halfway again.

As conventional technique concerning the backup and restoration, in, for example, U.S. Pat. No. 5,263,154 (Patent Reference 1), there has been disclosed a technique in which data stored in the storage system at a point of time designated by the user is reproduced (hereinafter, referred to as "backup of data") on a magnetic tape without stopping input and output (hereinafter, referred to as "I/O") of data from a host connected to the storage system, and through the use of the data thus reproduced (hereinafter, referred to as "backup data"), the data is recovered (hereinafter, referred to as "restore").

Also, in Japanese Published Unexamined Patent Application No. 2001-216185 (Patent Reference 2), in order to shorten time required to restore the data, there has been disclosed a technique in which information in a place where the data has been updated is retained as difference information after backup of the data is carried out, and when data stored in the storage system is restored with the backup data, only a portion of the backup data shown by the difference information is used to restore the data.

Also, in U.S. Pat. No. 5,544,347 (Patent Reference 3) and U.S. Pat. No. 5,742,792 (Patent Reference 4), there has been disclosed a technique for copying data by a remote storage system independently of the host. According to this technique, it is possible to make a copy of a business volume within the storage system which has been made by the host at a certain business site on a volume within the storage system at a remote site. For that reason, in consideration of a case where the business site suffers from a natural disaster and terrorism, the computer system causes an failure and the business cannot be continued, it is possible to prepare data for restoring the business at a remote site.

SUMMARY OF THE INVENTION

In the restoration processing described in Patent Reference 1, when reading out backup data from a magnetic tape, a portion which has not been updated from a point of time whereat the backup data has been acquired (that is, a portion in which the data of the storage system coincides with the content of data of the magnetic tape) is also read out from the magnetic tape, and is written in the storage system. It is wasteful to transfer such data, and it takes longer time to restore.

In the technique disclosed in Patent Reference 2, time to restore becomes short by an amount corresponding to readout of overlapped data which does not occur as compared with the technique of Patent Reference 1. As regards data which has been updated during a period of time from a time at which backup of data is carried out to a time at which the storage system develops a failure, however, the data cannot be restored by either technique. When an attempt is made to restore data which has been updated after backup of data is carried out, it is necessary for the host side to manage the content of update of the data and the like by the log and the like. For this reason, load on the host is great and it takes a long time to process.

Also, in Patent References 3 and 4, there has been disclosed the technique for creating data for restoring the business at a remote site on the assumption that the business site suffers from a disaster, and the computer system develops a failure and the business cannot be continued, but no consideration has been given to a measure against danger of copying at a remote site concerning unfair writing which is caused by writing during the disaster.

It is an object of the present invention to provide a computer system capable of restoring data at any given time prior to occurrence of the failure at high speed.

It is an object of the present invention to provide a storage system for restoring data at a remote site without imposing a burden on the host when restoring the data stored in the storage system.

The present invention is preferably realized by a storage subsystem including a first storage system and a second storage system, each of which is connected to a host via a communication channel, in which the second storage system stores a copy of data to be transmitted from the first storage system. In this storage subsystem, the first storage system processes an I/O request from the host, and as a result of the I/O processing to the second storage system, transmits updated data, and the second storage system retains data received from the first storage system as update log data. The host transmits a command for settling a state of an application to the first storage system as data, and the first storage system transmits the data to the second storage system. The host and the second storage system both retain an identifier corresponding to the command, and relate the identifier to the log data. When restoring the data to its original state, the host designates the identifier at any given time, whereby the second storage system restores data at any given time.

In a preferred example, the host issues an I/O instruction of state identification information to the second storage system at a remote site. The second storage system at the remote site receives the I/O instruction of the state identification information of the host, and relates the updated log of data to the identification information to store it in a storage unit.

According to the present invention, when restoring the data stored in the storage system, it is possible to restore data to its predetermined state at a remote site without imposing any burden on the host within a short time.

BRIEF DESCRIPTION OF THE DRAWINGS

FIG. 4 is a view showing structure of a table of storage management information 115, 150;

FIG. 5 is a view showing structure of a table of storage configuration information 116, 151;

FIG. 6 is a view showing structure of a table of volume configuration information 117, 152;

FIG. 7 is a view showing structure of a table of pair management information 118, 153;

FIG. 8 is a view showing structure of a table of log volume group information 110;

FIG. 9 is a view showing structure of a table of volume pool configuration information 156;

FIG. 11 is a view showing structure of a table of log ID management information 157;

FIG. 12 is a view showing structure of a table of mark ID management information 158;

FIG. 13 is a view showing a format of log data;

DETAILED DESCRIPTION OF THE PREFERRED EMBODIMENTS

Hereinafter, with reference to the drawings, the description will be made of one embodiment of the present invention.

Figure 1:
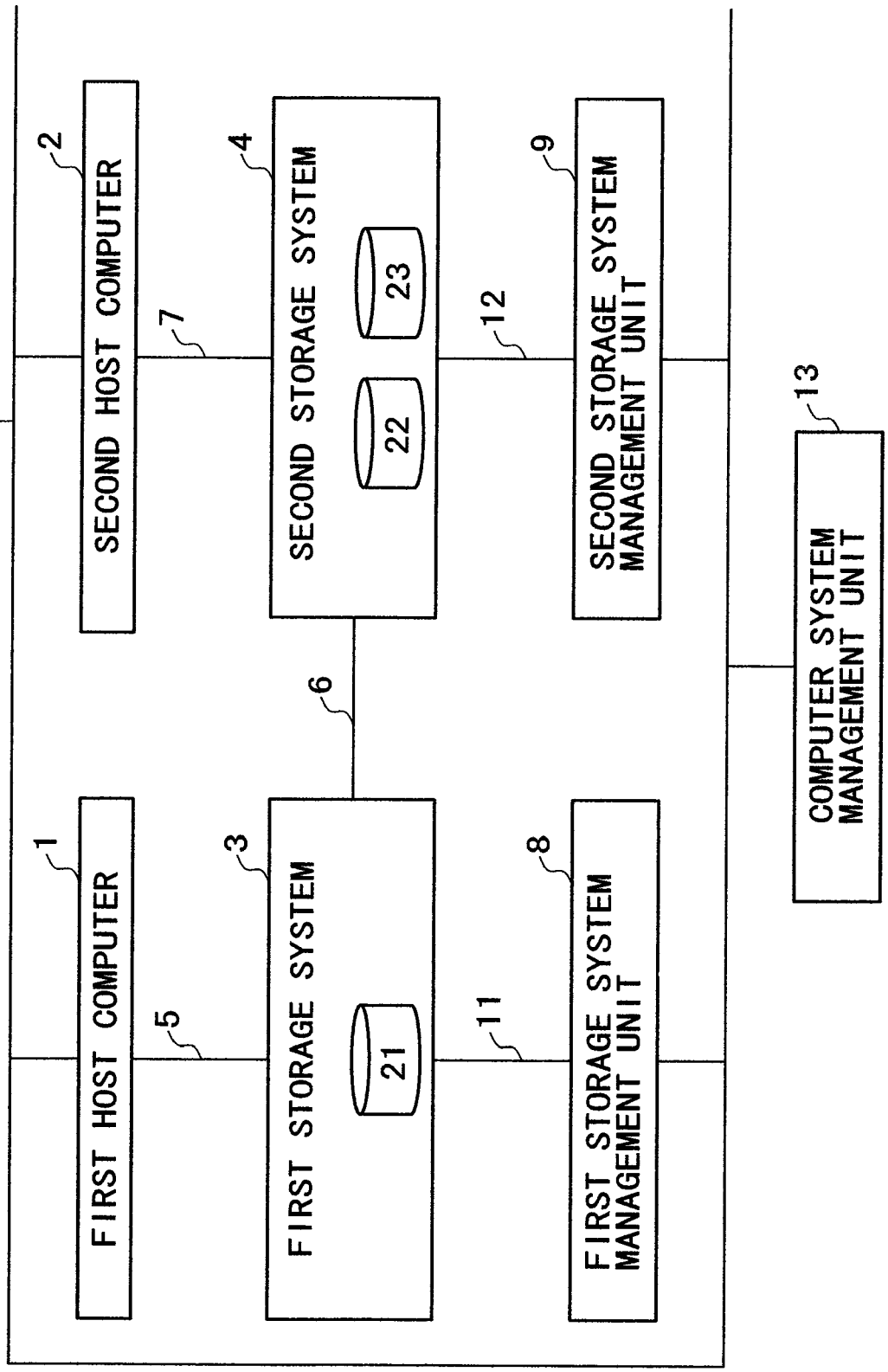
FIG. 1 is a block diagram showing structure of a computer system according to one embodiment.

FIG. 1 is a block diagram showing a computer system according to one embodiment.

This computer system includes a first host computer 1 (hereinafter, referred to as host 1), a second host computer 2 (hereinafter, referred to as host 2), a first storage system 3 (hereinafter, referred to as storage system 3 simply) to be connected to the host 1 via a communication channel 5, a second storage system 4 (hereinafter, referred to as storage system 4 simply) to be connected to the host 2 via a communication channel 7 and to be connected to the storage system 3 via a communication channel 6, a first storage system management unit 8 to be connected to the storage system 3 via a communication channel 11, a second storage system management unit (hereinafter, referred to as management unit) 9 to be connected to the storage system 4 via a communication channel 12, and a computer system management unit 13 to be connected to these structural units via a communication channel 10. The storage system 3, 4 is constructed by including such storage units 21, 22, 23 as, for example, a disk device and a disk array, and their control units. In this case, the second system side is positioned as a remote site.

The host 1 and the host 2 are computers such as personal computers, work stations and main frames. In the host 1, there are carried out operating systems (OS) corresponding to type of the computer, and various application programs (AP) corresponding to various business and use applications such as, for example, data base (DB) programs. In this respect, in this example, one each of the host 1 and host 2 is shown for the sake of simplicity, but a plurality of hosts 1 or hosts 2 to be connected to the communication channel 5 or the communication channel 7 may be provided.

The host 1 performs the predetermined processing in the computer system. In other words, the host 1 communicates commands and data required for I/O processing concerning information processing with the storage system 3 through the use of the communication channel 5, requests the storage system 3 to write the data created and changed in the host 1, and also requests to read data required for computer processing.

The storage system 3 receives commands and data to be transmitted via the communication channel 5 to conduct predetermined processing, and carries out a predetermined response to the host 1. The storage system 3 and the storage system 4 communicate commands and data between them via the communication channel 6.

Although the storage system 4 is actually the same in structure as the storage system 3, they are different in FIG. 1 in that the storage system 4 has a plurality of storage units 22 and 23. Although it will be described in detail later, of those two storage units, one storage unit 22 is used as a mirror of the storage unit 21, and the other is used for log data storage.

The management unit 8 is a computer for managing a failure, maintenance, structure, performance information and the like of the storage system 3 in addition to setting of the storage system 3. Similarly, the management unit 9 is a computer for setting the storage system 4 and also managing a failure, maintenance, structure, performance information and the like of the storage system 4. When, for example, the manager of the computer system sets such a logical storage unit as, for example, volume on the storage system 3 and the storage system 4, when setting a storage area for backing up the data, or when setting a pair of storage area when reproducing data, these management units 8 and 9 are used.

When maintaining and managing the storage system 3, setting a physical storage unit which the storage system 3 has, and setting the host 1 to be connected to the storage system 3, the system manager inputs contents that should be set on the management unit 8. The contents that the system manager has inputted to the management unit 8 are transmitted to the storage system 3 and the host 1 via the communication channel 11, 10.

The computer system management unit 13 is used to maintain and manage the entire computer system, and is normally operated and utilized by the system engineer.

The communication channels 5 and 7 are used for the host 1 and the host 2 to transmit a request for processing I/O and the like to the storage system 3 and the storage system 4 respectively. The communication channel 6 is used to transmit the request for processing I/O and the like between the storage system 3 and the storage system 4. For the communication channels 5, 6 and 7, there are used optical cable, copper wire and the like. Examples of communication protocols for use with these communication channels 5, 6 and 7 include, for example, Ethernet, FDDI, fiber channel, SCSI, Infiniband, TCP/IP, iSCSI and the like.

Communication channels 11 and 12 are used for the storage system 3 or 4 to transfer management information such as its own failure, maintenance, structure, and performance between those management units 8 and 9.

The communication channel 10 is used to transfer a command when the host 1, 2 acquires management information from the management units 8, 9, and to transmit management information of failure, maintenance, structure, performance and the like of the storage system 3, 4 to the host 1 from the management units 8, 9. Cable and communication protocol for use with the communication channels 10, 11, 12 may be the same as or different from the communication channels 5, 6, 7.

Figure 2:
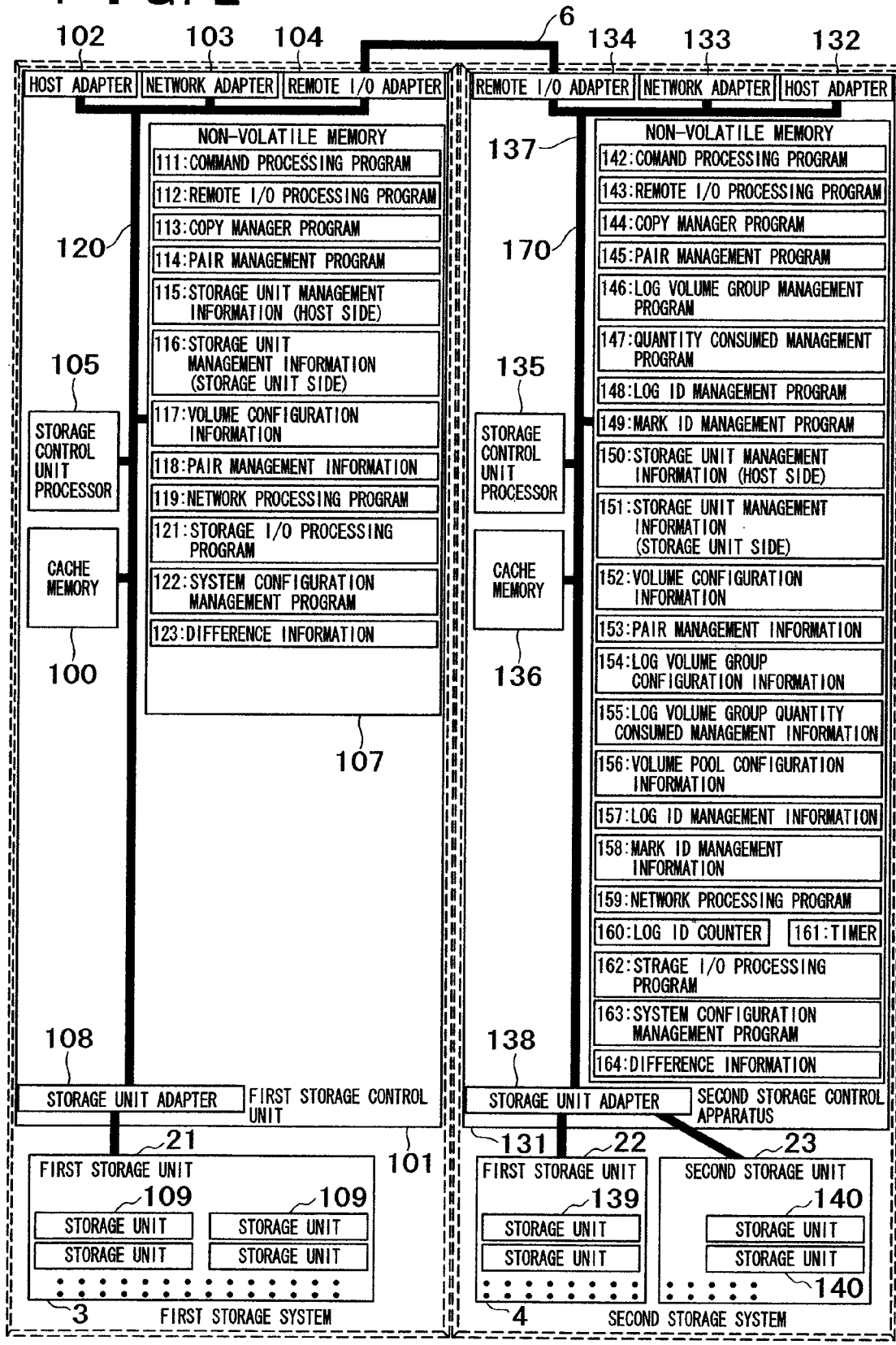
FIG. 2 is a block diagram showing structure of storage systems 3 and 4.

FIG. 2 is a view showing the structure of the storage systems 3, 4.

The storage system 3 is made up of a storage system control unit 101 and a storage unit 21, and a storage area of the storage unit 21 is provided to input and output from the host 1. In other words, the storage system 3 stores data and programs that the host 1 uses, receives an I/O processing request from the host 1, performs processing corresponding to the I/O processing request, and transmits the result to a predetermined host 1.

The storage control unit 101 has a storage adapter 108 to be connected to the storage unit 21, a processor 105 for executing a predetermined program, a program to be executed by the processor 105, a non-volatile control memory 107 in which information required in an operation of the program such as setting information, structural information and the like of the storage system 3 is stored, a network adapter 102 for connecting this storage system 3 to the communication channel 11, a host adapter 103 for connecting to the communication channel 5, and a remote I/O adapter 104 for connecting to the communication channel 6, and performs processing of the I/O request from the host 1 and control of the storage unit 21.

The storage unit 21 is made up of a plurality of logical storage units 109, each of which is referred to as "volume", and in each of the respective storage units 109, there is stored data for an user. The storage unit 21 is preferably configured to have RAID (Redundant Arrays of Inexpensive Disks) configuration having redundancy. As a storage medium of the storage unit 21, there are used media such as a silicon disk, an optical disk, an optical magnetic disk or a hard disk which are constructed by a magnetic disk and a nonvolatile semiconductor memory which are, for example, electrically nonvolatile storage media.

In this respect, a plurality of storage control units 101 may be present in the storage system 3. Also, in order to secure the redundancy of the storage system 3, it is advisable to redundant-construct a circuit for supplying power supply to each component element within the storage control unit 101, a circuit for transmitting and receiving data between each component element within the storage control unit 101, a cache memory 106, the non-volatile control memory 107, the storage adapter 108 and the like by making each of them duplex.

In order to control processing within the storage system 3, the non-volatile memory 107 stores therein each program of a command processing program 111, a remote I/O processing program 112, a copy manager program 113, a pair management program 114, a network processing program 119, a storage I/O processing program 121, and a system configuration management program 122. The non-volatile memory 107 stores an exclusive processing pit for accessing to an area in which there is the cache memory 106, and information indicating correspondence relationship between the storage unit 109 and the cache memory 107 therein for the I/O processing. In this respect, if there exist a plurality of storage control units 101 and processors 105, it is possible to have the non-volatile control memory 107 in common.

The cache memory 106 temporarily stores data to be transferred from the host 1 to the storage system 3 or data to be transferred to the host 1 from the storage system 3.

A local area network 120 causes the storage control unit 101, the cache memory 106 and the storage unit 109 to connect together to one another. The local area network 120 may be, for example, of a shared bus type configuration, and also of a star type and other network configuration.

The storage control unit 101 controls processing to be explained below by executing a program stored in the non-volatile memory 107 by the processor 104.

On receipt of the I/O processing request from the host 1 by the host adapter 102, the command processing program 111 analyzes content of the I/O processing request received. In accordance with the analysis result, the content of the I/O processing request executes readout I/O (hereinafter, referred to as "read I/O") of data, write I/O (hereinafter, referred to as "write I/O") processing request of data and the like. In the case of the write I/O processing request, the storage control unit 101 performs response processing to the write I/O processing request from the host 1, such as response processing whether or not it is in a state capable of receiving data to be actually transferred from the host 1, and further writes data for update (hereinafter, referred to as "write data") to be transferred in a place designated of the cache memory 106 or the storage unit 109. In the case of the read I/O processing request, the storage control unit 101 reads out data (hereinafter, referred to as "read data") corresponding to the read I/O processing request from a place designated of the cache memory 106 or the storage unit 109 to transfer to the host 1. Also, when other processing, for example, input and output I/F with the host is SCSI and an inquiry command (command for instructing device search) is received, the host I/O processing program controls an operation corresponding to the content of processing to be requested by the command.

The system configuration management program 122 is a program to be executed when the storage control unit 101 manages the storage system 3, and prepares, sets, changes, and deletes storage unit management information 115, 116. By executing the system configuration management program 122, the storage control unit 101 performs definition of the storage unit 109 to be inputted from the management unit 8, setting of the storage unit 109 which becomes a pair target for backup/snap shot, registration of information targeted for log storing and the like. In this case, the storage unit management information 115, 116 retains mapping information indicating correspondence relationship between address within the storage system and address for performing input to and output from the host storage unit, and information concerning the pair 118.

The storage I/O processing program 121 is a program to be executed when the storage control unit 101 performs read and write processing to the cache memory 106 or the storage unit

109. On executing a read-write I/O processing request, the system configuration management program 122 is executed to check the storage unit 109 at the access target for structure, it is calculated to which address in the storage unit 109 address at a place where read or write data which is designated by the read-write I/O processing request should be read out or stored corresponds, and on the basis of the calculation result, access to the storage unit 109 is performed.

The pair management program 114 is a program for managing a pair of a master volume (hereinafter, referred to as "M-VOL") and a remote volume (hereinafter, referred to as "R-VOL"). By executing the pair management program 114, the storage control unit 101 processes pair creation (Pair Create), pair suspension (Pair Suspend), pair resumption, and pair deletion (Pair Delete) concerning a storage unit ("R-VOL") 139 within the storage unit 22 which is located within the remote storage system 4 in which a reproduction of data stored in a certain storage unit 109 ("M-VOL") and M-VOL 109 is stored in accordance with an instruction from the host 1.

In this respect, it is also possible to set a plurality of R-VOLs against one M-VOL for creating. Also, it is also possible to set and create a R-VOL which makes a pair with a new M-VOL with the R-VOL as a new M-VOL.

The pair management information 118 registers information indicating whether or not a certain M-VOL 109 is in a pair state (Pair Duplex), in a pair created state (Pair Create) and in a pair suspended state (Pair Suspend).

By executing the copy manager program 113, the storage control unit 101 copies data on the R-VOL in order from the head address of the M-VOL 139 during pair creation, whereby data stored in the M-VOL is backed up in the R-VOL. Further, the storage control unit 101 gives an instruction to the remote I/Os processing program 112 to copy data in a portion having a difference from M-VOL to R-VOL by referring to difference information 123, and to conversely copy data having a difference from R-VOL to M-VOL by referring to the difference information 123. In this case, the difference information 123 is a bit map provided correspondingly to the storage area of the storage unit 109 in order to prevent copy data of M-VOL and R-VOL from disagreeing with each other, and when data of the storage area of the storage unit 109 is rewritten after remote-copied, a bit flag will be set correspondingly to the area thus updated for management.

Also, the pair management program 114 restores data of the storage unit 109 designated in accordance with a restore request from the host 1. In this respect, details of the restore processing will be described later.

In the foregoing, the description has been made of the structure of the storage system 3 on the master site side.

On the other hand, the storage system 4 on the remote site side also has the similar program and information basically. Major points of difference will be described. The storage unit 22 stores copy data of the storage unit 21 on the master site side while the storage unit 23 stores log data that occurred on the master site side. The log data that occurred on the master site side may be stored in the storage unit on the master side as a matter of course, and in the example shown in FIG. 2, the structure is arranged such that the log data is transmitted to the remote storage system 4 via the communication channel 6 to store in a logic storage unit 140 within the storage unit 23. In this respect, the structure of logic storage unit (volume) 139, 140 within the storage unit 22, 23 is similar.

As regards information to be stored in the non-volatile memory 137, each program of a command processing program 142, a remote I/O processing program 143, a copy manager program 144, a pair management program 145, a network processing program 159, a storage unit I/O processing program 162, and a system configuration management program 163, storage unit management information 150, 151, volume configuration information 152, pair management information 153, difference information 164 and the like are similar to the program or information on the master site side corresponding thereto.

In order to perform a characteristic operation of storing log data and its management information in the storage unit 23 at a remote site and restoring the log data on the basis of the management information, however, in the non-volatile memory 137, there are stored a log volume group management program 146, a quantity consumed management program 147, a log ID management program 148, a Mark ID management program 149, log volume group configuration information 154, log volume group quantity consumed management information 155, volume pool configuration information 156, log ID management information 157, and Mark ID management information 158. Functions and meaning of these programs and information will be explained in order hereinafter.

Figure 3:
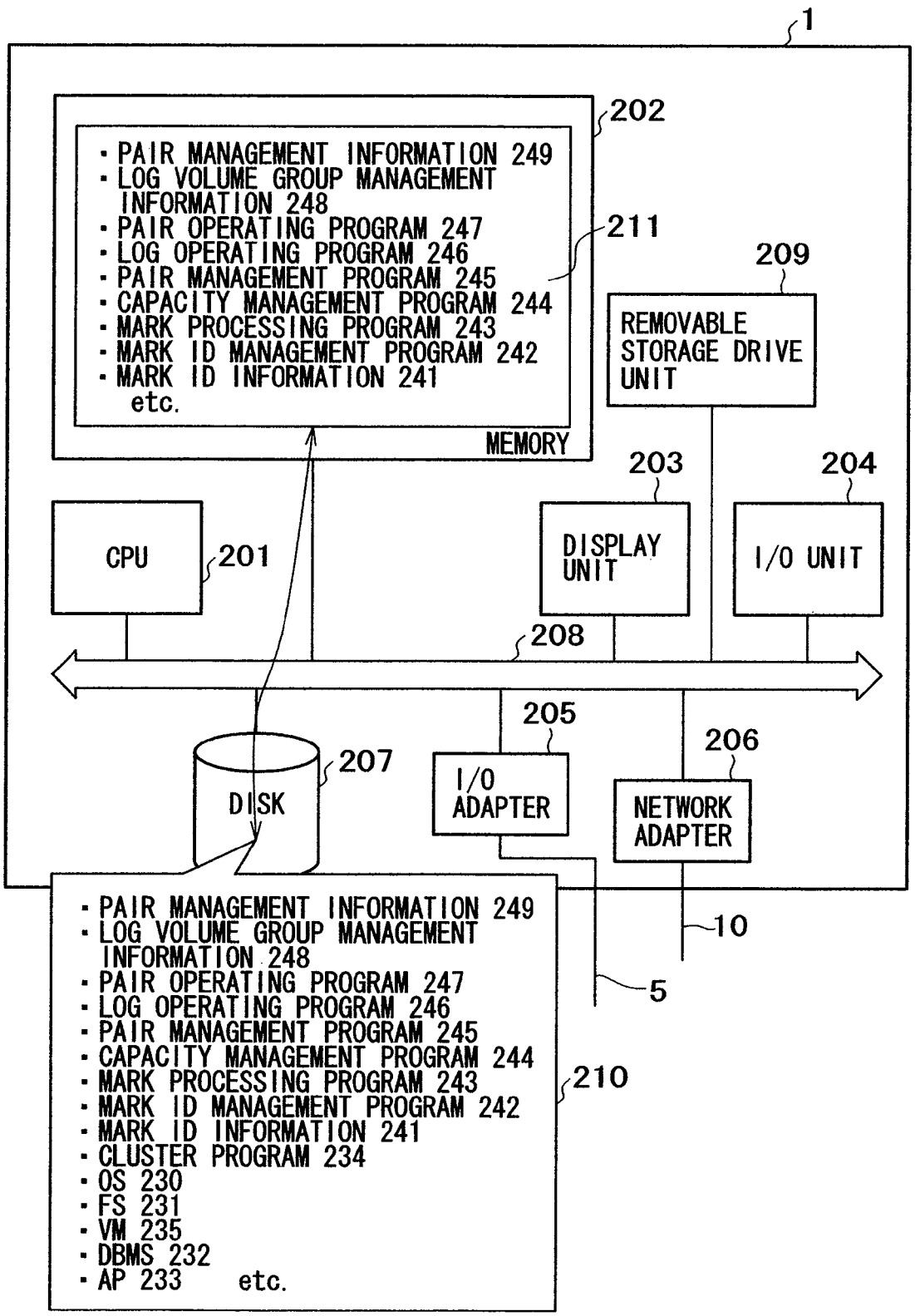
FIG. 3 is a block diagram showing structure of a host 1.

Next, with reference to FIG. 3, the description will be made of the structure of the host 1.

The host 1 will be exemplified for description, and the structure of the host 2 is actually similar to the host 1.

The host 1 is configured to have a processor 201 for executing a predetermined program; a memory 202 to be used for storing OS, AP and data to be used by the AP; a disk unit 207 in which OS, AP and data to be used by the AP are stored; an I/O adapter 205 for connecting to a communication channel 5; a network adapter 206 for connecting to a communication channel 10; a removable storage drive unit 209 for controlling readout and the like of data from a portable storage medium such as a floppy disk; a display unit 203 such as a liquid crystal display; an input device 204 such as a keyboard and a mouse; and a local I/O network 208 to be used for transferring data of OS and AP and control data by connecting these configuration units together.

Examples of the portable storage media for use with the removable storage drive unit 209 include optical disks such as CD-ROM, CD-R, CD-RW, DVD and MO, magnetic disks such as optical magnetic disks, hard disks and floppy disks, and the like. In this respect, each program to be explained below is installed in the disk unit 207 of the host 1 by being read out from the portable storage medium via the removable storage drive unit 209 or by passing through the network 4 or 5. In this respect, the host 1 may have a plurality of configuration units such as the processor 201 in order to secure the redundancy.

Next, the description will be made of an example of a program to be executed by the host 1.

These programs 210 are stored in the disk unit 207 of the host 1 or the memory 202, and are executed by the processor 201.

The host 1 has AP 233 for operating under OS230, and data base management software (hereinafter, referred to as "DBMS") 232. The DBMS232 accesses the storage system 3 via the OS230, a file system (FS) 231, a volume manager (VM) 235 and the like. Also, the DBMS232 communicates I/O processing of transaction processing and the like with another AP 233 which the user uses. With the objective of improving the information processing performance, the processor 201 executes information processing through the use of a memory 202 of the host 1.

Also, information having correlation between a plurality of logical storage units which the host 1 performs input and output is retained as log volume group management information 248. Also, the pair management information 249 retains M-VOL which is a logical storage unit in which the host 1 performs input and output, and management information of R-VOL which makes a pair therewith. A pair operating program 247 performs pair operation, pair creation (Pair Create), pair suspension (Pair Suspend), pair resumption and pair deletion (Pair Delete) on the storage system 3. A log operating program 246 performs a log operation such as log acquisition commencement and log acquisition completion. A pair management program 245 monitors a pair state of the storage system 3 and monitors for a failure. A capacity management program 244 retains the capacity of the storage system 3 as information, and calculates the total capacity of the logical storage unit to be contained in the log volume group. A mark processing program 243 is called after commitment processing when AP 233 or DBMS 232 saves or closes a file, creates mark data and writes on the storage system 3. A mark ID management program 242 creates mark data through the use of a timer and mark ID information 241 when a mark processing program 243 writes mark data. Mark ID information 241 is management information against the log ID, and is made up of mark ID and log time information.

Next, with reference to FIGS. 4 and 5, the description will be made of storage unit management information 115, 150 and storage management information 116, 151. In this respect, symbols on the storage system 3 side will be referred to for the description.

In FIG. 4, storage unit management information 115 is a table having an entry 301 for creating an address concerning a storage unit 21 to be provided for the host 1, and an entry 302 for creating a logical address for identifying storage units 21 in the storage system 3 in a unified way.

The entry 301 has an entry 303 for creating an identifier of a storage unit to be provided for a host computer and an entry 304 for creating its internal address. Also, the entry 302 has an identifier 305 of the logical storage unit 109 within the storage unit 21 for identifying the storage units in a unified way in the storage system 3, and an entry 306 for creating its internal address.

In FIG. 5, storage management information 116 is a table having an entry 401 for registering a logical address for identifying storage units 21 within the storage system 3 in a unified way, an entry 402 for registering an address concerning RAID Group, and an entry 403 for registering an address concerning a disk which constitute the RAID Group.

Further, the entry 401 has an entry 404 for registering a logical storage number which identifies, in a unified way, logical storage units 109 within the storage system 3, and an entry 405 for registering internal addresses corresponding to the storage units. The entry 402 has an entry 406 for registering a RAID Group number for identifying, in a unified way within the storage system 3, RAID Group in which there are arranged logical storage units to be identified by the logical storage number which identifies, in a unified way, logical storage units 109 within the storage system 3, and an entry 407 for registering an address corresponding in virtual space in which the RAID Group has been handled as one storage area. Also, the entry 403 has an entry 407 for registering a disk number for identifying, in a unified way within the storage system 3, disks which form the RAID Group, and an entry 408 in which disk internal addresses are registered.

Next, with reference to FIG. 6, the description will be made of volume configuration information 117, 152 shown in FIG. 2. In this respect, since the volume configuration information 152 is also similar, symbols on the storage system 1 side will be referred to for description.

The volume configuration information 117 is a table for registering information concerning configuration of the volume in the storage system 3. In the entry 501, there are registered logical storage numbers which handle logical storage units within the storage system 3 in a unified way. On the entry 502, there are registered host types. In other words, there is registered information indicating which storage unit capable of being recognized OS of a host for performing input/output to the logical storage unit emulates, such as "OPEN" indicating a storage unit capable of recognizing OS of an open line system, and "3990" indicating a storage unit capable of recognizing OS of a main frame system.

In the entry 503, there is registered pass definition information indicating whether or not it is related to an I/O port so as to allow the host 1 to perform input/output. If, for example, the I/O network is FC, there will be registered information concerning linking the logical storage unit with a port of FC.

The entry 504 is used to register a state of the logical storage unit, and there is registered, for example, information indicating a normal state (NORMAL) in which the logical storage unit develops no failure, but input/output can be performed, or information indicating a state (BLOCKED) in which input/output cannot be performed because of a failure and the like. Further, as failure information, there is registered information indicating whether or not the logical storage unit has developed some failure or other. In this case, the failure includes physical failures of physical storage units mainly constituting the logical storage unit and logical failures when the manager has consciously set the storage system to a blocked state.

The entry 505 is used to register reserved information, and there is registered, for example, information indicating whether or not the logical storage unit is in a reserved state in order to store R-VOL or log data. The logical storage unit in which reserved information has been registered cannot be newly allocated to other use applications, and, for example, as a logical storage unit for business use.

When the logical storage unit 109 forms a pair, a pair number is registered on the entry 506 for registering pair information, and when acquiring log data within the storage unit, a log volume group number is registered on the entry 507 for registering log volume group numbers. If there is effective information, for example, a log volume number on the entry 506, there will be registered information indicating whether or not the logical storage unit is a target of log acquisition, that is, a target of journal mode. Also, on the entry 508, there is registered capacity of the logical storage unit 109.

Next, with reference to FIG. 7, the description will be made of pair management information 118, 153. In this respect, reference numerals on the pair management information 118 side will be referred to.

The pair management information 118 is a table for registering identifiers of the original and duplicate logical storage units constituting the pair. In other words, a pair number is registered on the entry 601. On the entry 602, there is registered a unified logical storage unit (M-VOL) number within the storage system 3 on the master side for forming the pair. On the entry 603, there is registered information for identifying the logical storage unit (R-VOL) located in the storage system 4 on a remote side which forms M-VOL and the pair. For example, on the entry 603, there are registered an identifier of an I/O port to be connected through the communication channel 6 and a unified storage number within the storage system 4 accessible from this port. On the entry 604, there is registered information indicating states of pair, such as, for example, pair state, pair being created, pair being suspended, and pair being recreated.

Next, with reference to the drawings of FIG. 8 and thereafter, the description will be made of the structure of a table peculiar to the storage system 4 on the remote side.

FIG. 8 is a view showing a configuration of a table of log volume group configuration information 154. The log volume group configuration information 154 is prepared for each log volume group. In a column 701, there is stored information for identifying each log volume group. In a column 702, there is stored the total number of the logical storage units grouped into a log volume group. In a column 703, there is stored the sum total of capacities of the logical storage units grouped into the log volume group.

In a column 704, there are registered identifiers 705 of logical storage units grouped into a log volume group, host types 706, states 707, and capacity 708 corresponding to the number of logical storage units grouped into a log volume group respectively. In a column 709, there is registered a number of identifiers of a logical storage unit of volume for a log to be used in the log volume group, and in a column 710, there is registered the sum total of capacities of logical storage units of volume for a log to be used in the log volume group.

In a column 710, there are registered identifiers 711 of logical storage units of volume for a log to be used in the log volume group, host types 712, states 713, and capacities 714 corresponding to the number of logical storage units of volume for a log to be used in the log volume group respectively.

Next, with reference to FIG. 9, the description will be made of the configuration of a table of volume pool configuration information 156.

The volume pool configuration information 156 is a table for collectively managing a logical storage unit in which pass has not been defined in advance and a logical storage unit in a reserved state so as to facilitate expanding the capacity when the capacity of a storage unit for storing log data to be used in the log volume group becomes insufficient.

In an entry 801, there is registered a logical storage number of the storage system 4. In an entry 802, there is registered a host type of a logical storage unit which is identified by the number of the entry 801. In an entry 803, a state of the logical storage unit is likewise registered, and in an entry 804, reserve information of the logical storage unit is registered. In an entry 805, the capacity of the logical storage unit is registered.

Figure 10:
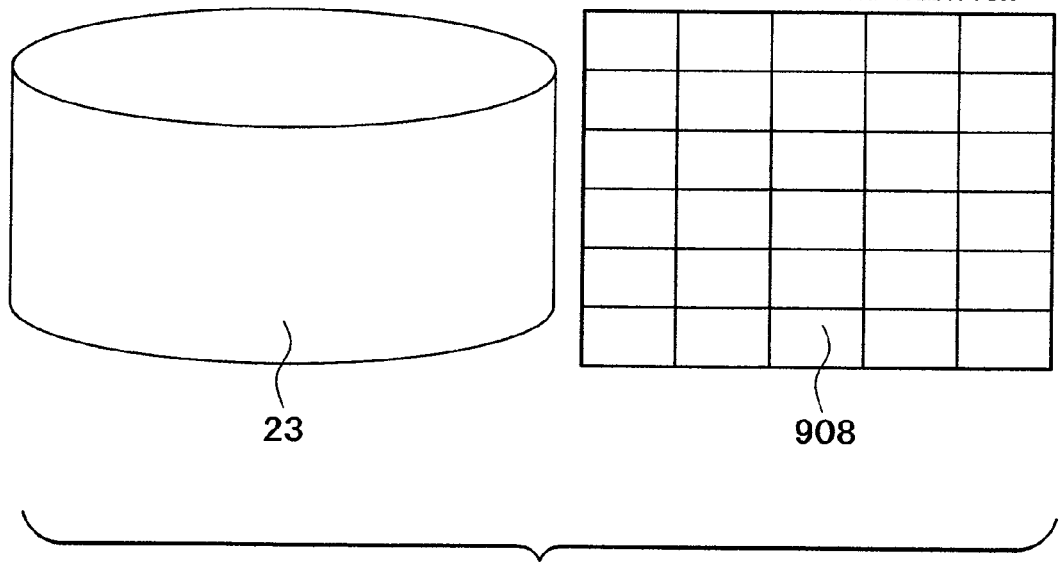
FIG. 10 is a view showing structure of a table of log volume quantity consumed pool management information 155.

FIG. 10 shows the configuration of a table of log volume group quantity consumed management information 155.

The log volume group quantity consumed management information 155 is prepared in order to monitor consumed quantity of the storage unit which stores log data for each log volume group. In an entry 901, there is registered a log volume group number, and in an entry 902, there is registered full free capacity within the log volume group.

In an entry 903, there is stored a number of the logical storage unit of volume for a log to be used in the log volume group. In an entry 904, there is stored capacity information of the logical storage unit to be identified by the entry 901. In an entry 905, there is registered capacity of an area used in write I/O. The capacity of this area can be grasped by referring to a table of usage monitor information 908. In other words, the usage monitor information 908 manages a logical storage unit 139 of volume for a log with a bit map, and manages by setting up a bit in an area where there has been write update. A bit map of this usage monitor information 908 is stored within a non-volatile memory 137 of the storage control unit 131.

In an entry 906, there is stored remaining capacity information which no write update has been performed. In an entry 907, there is stored information indicating a ratio of a free capacity to the total storage capacity of the log volume group.

FIG. 11 shows the configuration of a table of log ID management information 157.

The log ID management information 157 is a table for managing identification information (ID) to be added to the log data when creating a log of the I/O level by receiving update data due to the write I/O to be transmitted from the storage system 3 by the storage system 4. In other words, the table of the log ID management information 157 is made up of: an entry 1001 for storing ID value of the oldest log data for each log volume group in order to manage log ID counter added to the log data; an entry 1002 for storing time information in which the data has been created; an entry 1003 for storing address information of log volume in which the data has been stored; an entry 1011 for storing ID values of the newest log data; an entry 1012 for storing time information in which the data has been created; and an entry 1013 for storing address information of log volume in which the data has been stored.

When a command to be processed is write I/O or mark I/O to a logical storage unit 140 in which the log data is to be stored, a command processing program 142 refers to a log ID counter 160 and a timer 161 which are to be prepared for each log group, and creates log ID management information by adding a value (log data ID) of the counter 160 and a value (time) of the timer 161.

Next, with reference to FIG. 13, the description will be made of a log data format.

Every time the storage system 4 processes a request for processing write I/O or mark I/O from the storage system 3, log data is created on a cache memory 136, and thereafter is stored in the storage unit 140. A mark flag 1201 is added to the log data at the head thereof. The mark flag 1201 is an identifier for identifying whether or not it is mark information for uniquely identifying a state of the system by the host 1 and the storage system 4. The log data is constituted to have, behind the mark flag 1201, respective entries of a log ID (that is, value of log ID counter) 1202, a timer value 1203, and a data length 1204, and further an entry 1205 in which the write data or mark data is stored.

The mark data is made up of an entry for storing an address 1210 of log volume which stores log data, an entry when the host 1 stores a mark ID 1211, an entry for storing time 1212 during which the mark has been executed, and an entry in which identification information 1213 of an application which has requested a mark is stored.

On the other hand, the write data is made up of an entry for storing an address 1220 of log volume which stores write data, and an entry for storing write data 1221.

Figure 20:
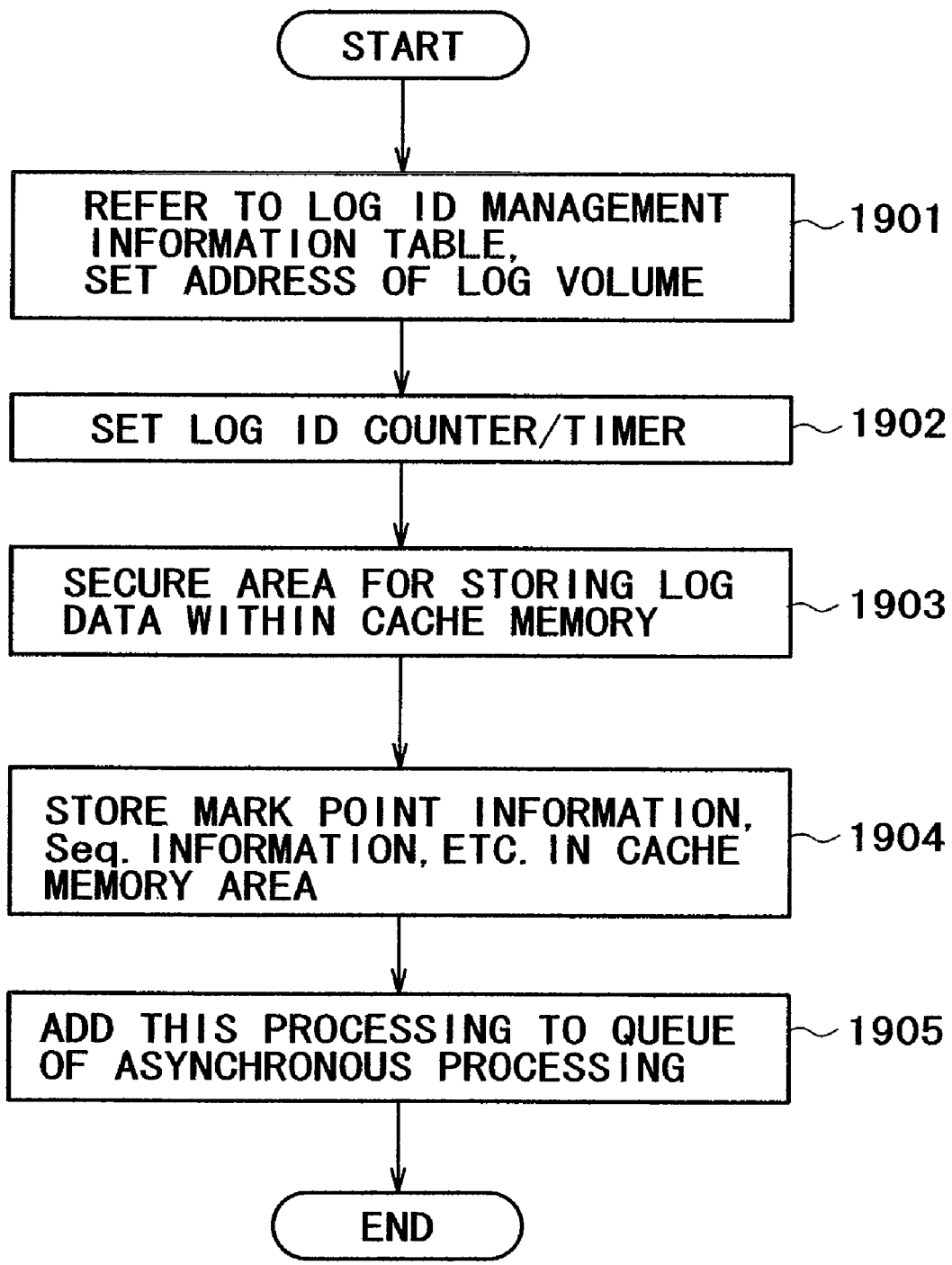
FIG. 20 is a view showing a flowchart for a log data creating operation at a remote site.

In this respect, creation of the log data will be described later with reference to FIG. 20.

Next, with reference to FIG. 12, the description will be made of the configuration of a table of MARK ID management information 158.

The MARK ID management information 158 is a table for managing the MARK ID information, and is figured to have an entry 1101 for storing a value of the oldest mark sequence number for each log volume group, an entry 1102 for storing time information in which the data has been created, an entry 1103 for storing address information of log volume in which the data has been stored, an entry 1104 for storing an ID value of the most recent mark data, an entry 1105 for storing time information in which the data has been created, and an entry 1106 for storing address information of log volume in which the data has been stored.

When the host 1 receives a mark command to be transmitted, a command processing program 111 uses this mark command to receive the mark information transmitted to the storage system 3. If it is the mark command, the mark information will be converted to log data form as shown in FIG. 20, and on that occasion, a mark ID 1211 within the data will be read out and stored on the table for management.

Next, with reference to the flowchart, the description will be made of the respective processing operations.

First, an outline of the entire processing operation will be described.

In a computer system according to the present embodiment, in the storage system 4, there is created and retained a negative logic storage unit (R-VOL) having backup data (hereinafter, referred to as "snapshot data") of data of a positive logic storage unit (M-VOL) of the storage system 3 at any given time. At a point of time whereat the snapshot data has been created and onward, every time a write I/O processing request to be received from the host 1 is executed, update data which has been produced in the storage system 3 will be transmitted from the storage system 3 to the storage system 4. The storage system 4 records data (that is, write update data) after write I/O processing in a storage unit 23 as log data.

Further, the host 1 informs the storage system 3 of mark point information (hereinafter, referred to as "MP information") that is arbitrary information that the host 1 itself creates, that is, information when a mark is added. Specifically, the host 1 writes the MP information in the log data of the storage system 4 at any given time, for example, when processing (sink processing) for causing data to coincide with each other between the storage system 3 and the storage system 4 is performed. Therefore, the MP information is to be managed by both the host 1 and the storage system 4. Thereby, through the use of the MP information that the host 1 designates and the MP information that has been stored in the log data within the storage system 4, the storage system 4 can restore at high speed data that the storage system 4 has retained since the host 1 intended (when MP information has been created).

In order to execute such processing, the host 1 transmits an instruction to prepare for acquisition of log data (instruction of preparation for commencement of log acquisition) and an instruction to commence log acquisition to the storage system 4 in advance. Thereby, the storage system 4 commences acquisition of log data to go into a log mode. Thereafter, the computer system communicates the above-described MP information.

Figure 14:
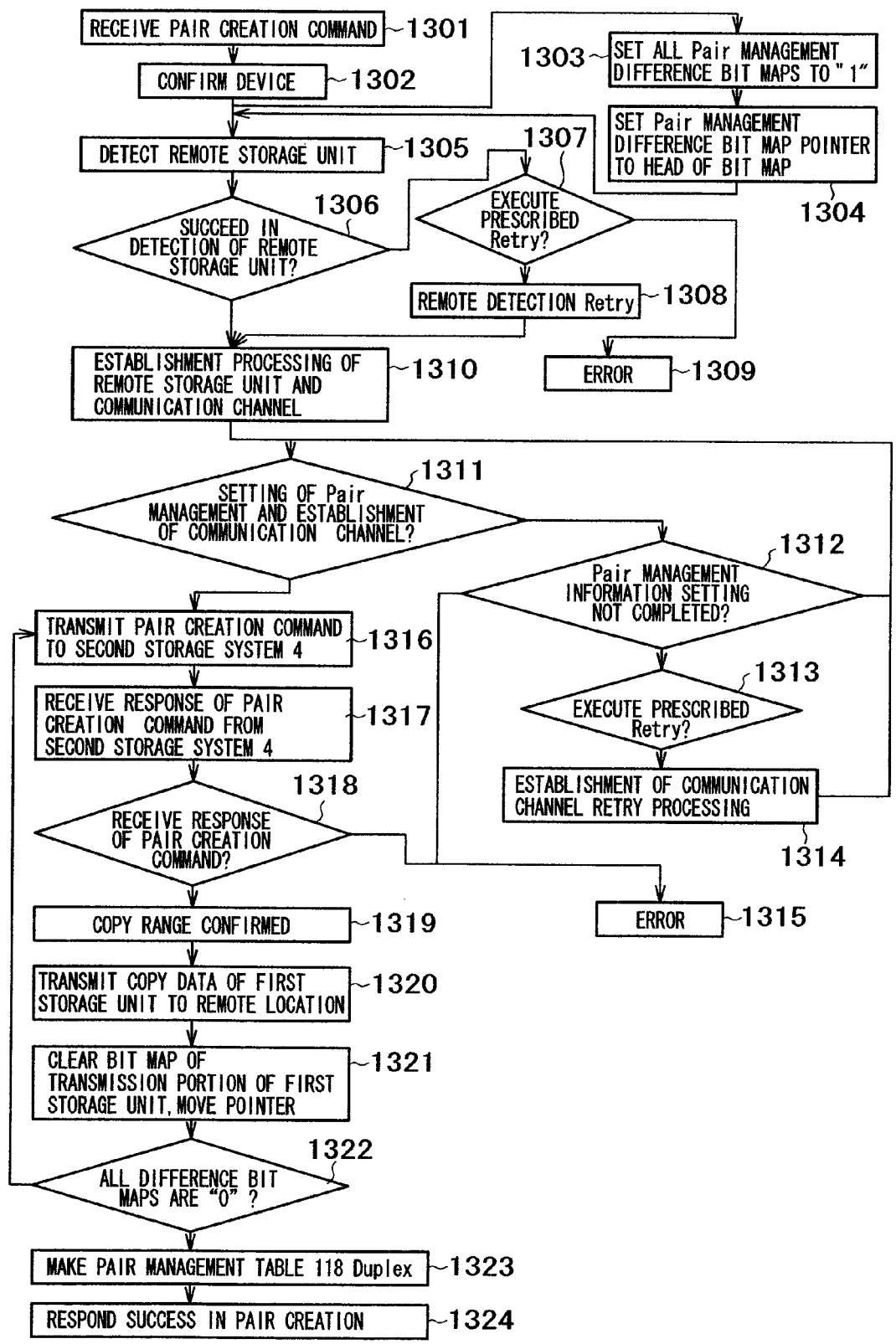
FIG. 14 is a view showing a flowchart to be used for explaining a processing operation of creating a pair.

First, with reference to FIG. 14, the description will be made of a processing operation of pair creation.

The storage system 3 receives a command for instructing creation of a pair from the host 1 (1301). Then, a command processing program 111 calls a pair management program 114, and delivers content of the command for requesting creation of a pair. The pair management program 114 refers to the command information and checks a device (storage unit) targeted for instructing pair creation (1302). All bits of a difference management bit map 123 for pair management are set to "1", a pointer for managing progress of copying is prepared in order to copy, and the head of a pair management difference bit map 908 is set (1303, 1304).

When a remote storage system 4 has been designated as a storage unit targeted for the pair, the remote storage unit is detected to carry out establishment of a communication channel (1305). If the remote storage unit cannot be detected (1306), retry processing will be carried out (1307). If the remote storage unit cannot be detected after all, it will be responded to the host 1 that a failure occurs (1309). In this respect, if there has been established a communication channel between the storage system 3 and the storage system 4 in advance in the design of the system, there will be no need for this series of processing.

When the remote storage unit is detected (1306), the communication channel with the remote storage unit will be established (1310). Thereafter, if setting of the pair management information and establishment of the communication channel have been completed (1311), a pair creation command will be transmitted to the storage system 4 (1316). Thus, if the storage system 3 receives a response to the pair creation command from the storage system 4 (1317, 1318), a copy manager program 113 will set a copying range (1319) to create data for being transmitted to the remote storage system 4. Thus, a remote I/O processing program 112 will be carried out to transmit the data to the remote side, and a copying progress pointer will be advanced (1320). On receipt of a completion report of the data transmission from the storage system 4, the bit map 123 of the transmission portion will be cleared ("0") (1321).

Thus, if it is determined whether or not all the difference bit maps 123 are "0" and all is cleared (1322), a pair state 604 of a pair management table 118 will be registered to "DUPLEX" (1323) to return a pair creation completed report to the host 1 (1324).

In this respect, when information to the effect that there has occurred a defect such as a request to confirm the state from the storage system 4 and an error report has returned as a response in the establishment of the communication channel or in the communication of a command or data between the storage system 3 and the storage system 4, or when response time of a command is long and the time is over, an error report will be returned to the host 1.

Figure 15:
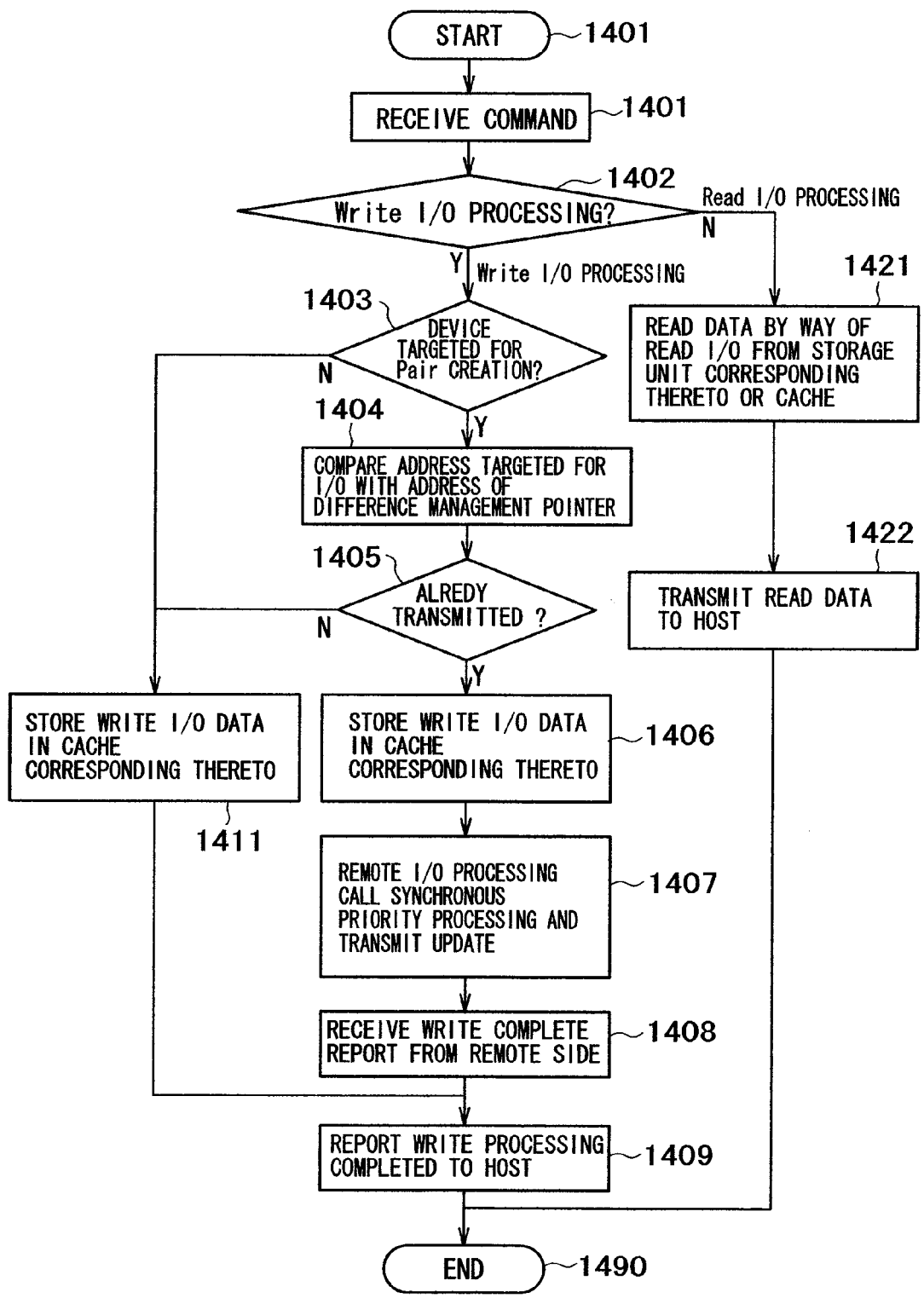
FIG. 15 is a view showing a flowchart to be used for explaining a command processing operation while a pair is being created.

Next, with reference to FIG. 15, the description will be made of a command processing operation during pair creation.

Even during pair creation, the storage system 3 receives input/output of data from the host 1 and a command to monitor a state and the like of other systems at any time. An operation of the command processing program 111 for processing a request to process the I/O at this time will be described.

On the receipt of the command, the command processing program 111 determines whether or not it is a request to process a write I/O (1401, 1402). As a result of this determination, in the case of the write I/O, it is confirmed whether or not it is a device (storage unit) targeted for pair creation (1403). If it is the device targeted for pair creation, an address targeted for write I/O is prepared with an address of a pair difference management pointer (1404), and it is confirmed whether or not the write I/O has been transmitted (1405). If already transmitted, a predetermined area of the cache memory 106 will be secured to store the write I/O data (1406). Thus, the pair management program 114 will be called to deliver information of the area of the cache memory 106 in which this write I/O data has been stored. In order to preferentially perform transmission processing of the write data to the remote side, the pair management program 114 creates the I/O processing command and data to the remote side through the use of the pair information to transmit the data to the remote second storage system 4 through the use of the remote I/O program (1407). On receipt of a response to the write completion report from the storage system 4 (1408), a write processing completion report will be returned to the host 1 (1409).

On the other hand, when it is out of the remote pair target (1403N) or when data for pair creation has not yet been transmitted (1405N), an area of the cache memory 106 is secured to store the data (1411), and thereafter, a report of write processing completed will be returned to the host 1 (1409).

Also, when it is out of the write I/O processing in the determination (1402) as to whether or not it is the write I/O, predetermined processing is performed to return a report of processing completed to the host 1. In the case of, for example, read processing, data will be read out of a cache memory or a storage unit corresponding to an address targeted for read I/O (1421) and after the read data is transmitted to the host 1, a report of completion will be returned (1422).

Figure 16:
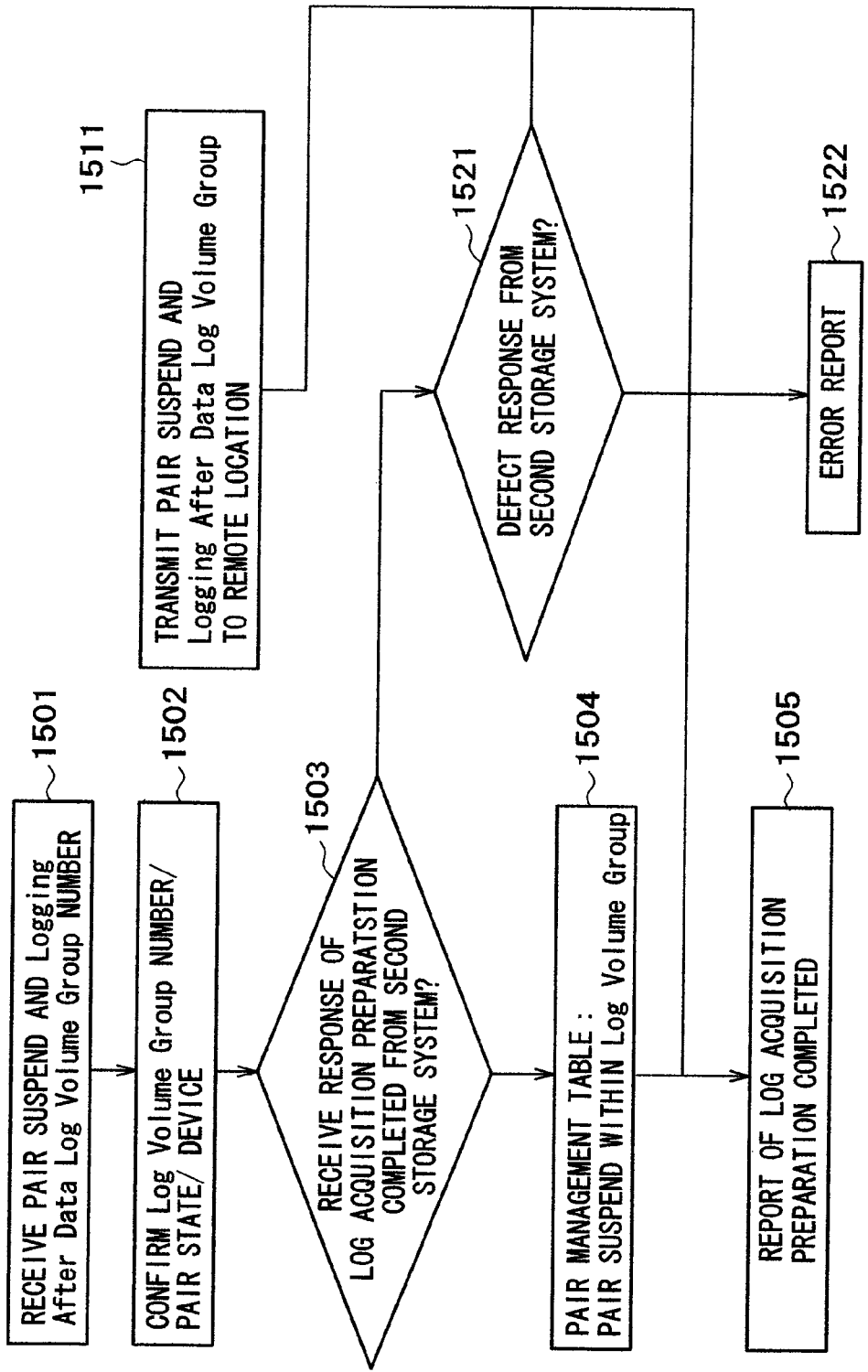
FIG. 16 is a view showing a flowchart for a log acquisition commencement processing operation on the master side.

Next, with reference to FIG. 16, the description will be made of log acquisition commencement processing on the master side.

If a pair is established between a storage unit 21 in the storage system 3 and a storage unit 22 in the second storage system and a DUPLEX state is brought about, even if error data is caused to be transmitted to the remote location because of a disaster, the host 1 will transmit a pair suspend command and a log data acquisition commencement command to prevent it from being reflected on the pair on the remote side immediately.

On receipt of a pair suspend command and a log data acquisition commencement command to be transmitted from the host 1 (1501), the storage system 3 analyzes the command thus received, calls the pair management program 114 to confirm the log volume group number, the pair state, and the device (storage unit) (1502), executes the remote I/O program 112 to transmit a suspend command and a log data commencement command to the remote storage system 4 (1511).

Subsequently, the storage system 3 waits for receiving response of log acquisition preparation completed to be transmitted from the storage system 4. On receipt of the response of preparation completed (1503), a pair management program 145 on the storage system 4 side deduces a pair number of pair configuration information 118 based on a storage number concerning a pair indicated to set the state of this pair within the log volume group to SUSPEND (1504). Thereafter, a report of completion concerning the log acquisition command will be returned to the host 1 (1505).

On the other hand, when response of defect is received (1521) in place of response of log acquisition preparation completed (1503), an error report will be transmitted to the host 1 to complete the processing (1522).

Figure 17:
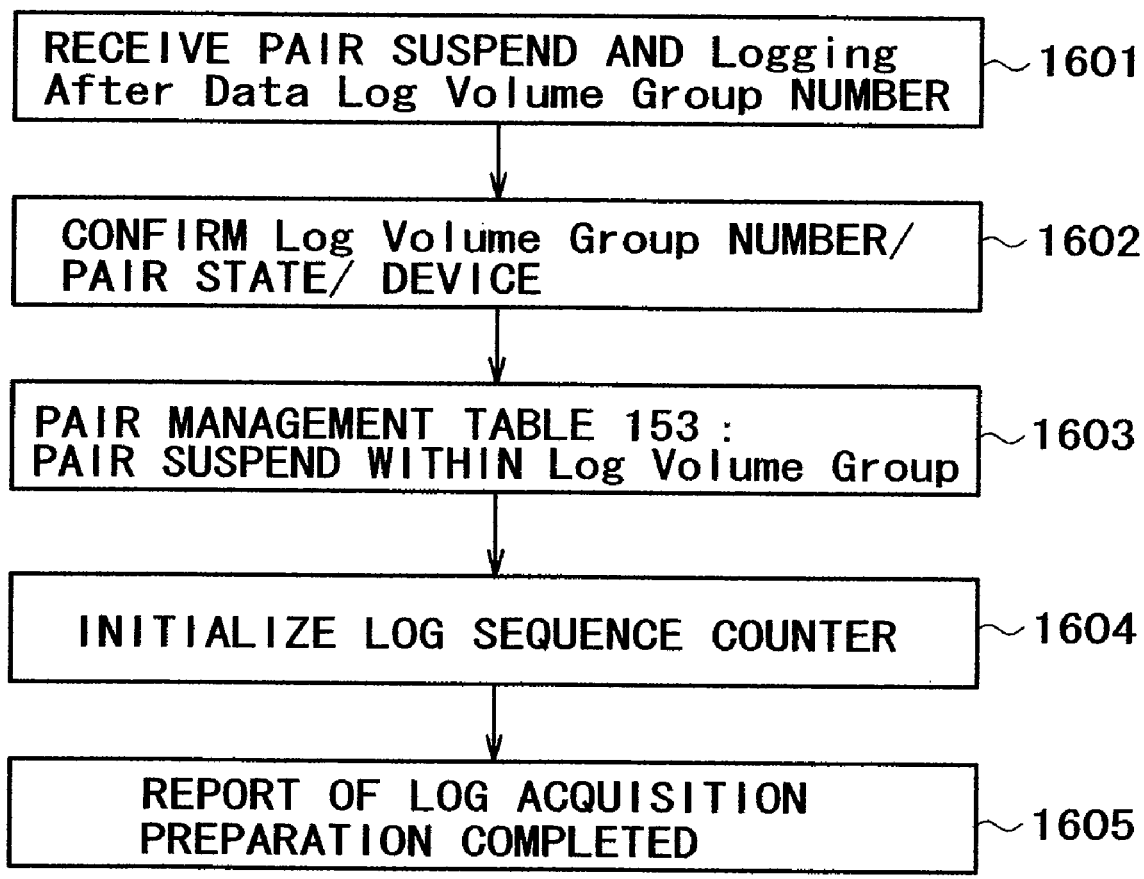
FIG. 17 is a view showing a flowchart for a log acquisition commencement processing operation on a remote side.

Next, with reference to FIG. 17, the description will be made of log acquisition commencement processing on the remote side.

On receipt of a pair suspend command and a log data acquisition commencement command from the storage system 3 (1601), the storage system 4 on the remote side analyzes the command thus received, and calls the pair management program 145 to confirm the log volume group number, the pair state, and the device (1602).

Subsequently, the storage system 4 on the remote side confirms the pair with reference to the volume configuration information table 152 to suspend the relevant pair management information table 153 (1603), and confirms whether or not reserve for log volume has been prepared. If the reserve for log volume is not prepared at this time, a logical storage unit 140 will be allocated. Thereafter, a log sequence counter for log volume group will be initialized (1604) to set a log volume group information flag to ON, and a report of completion will be transmitted to the storage system 3 (1605).

Next, with reference to FIGS. 18A and 18B, the description will be made of a processing operation of a MARK command.

In order for both the host 1 and the storage system 4 to retain the same mark information, a mark command issued from the host 1 is transmitted to the storage system 4 through the storage system 3.

Figure 18A:
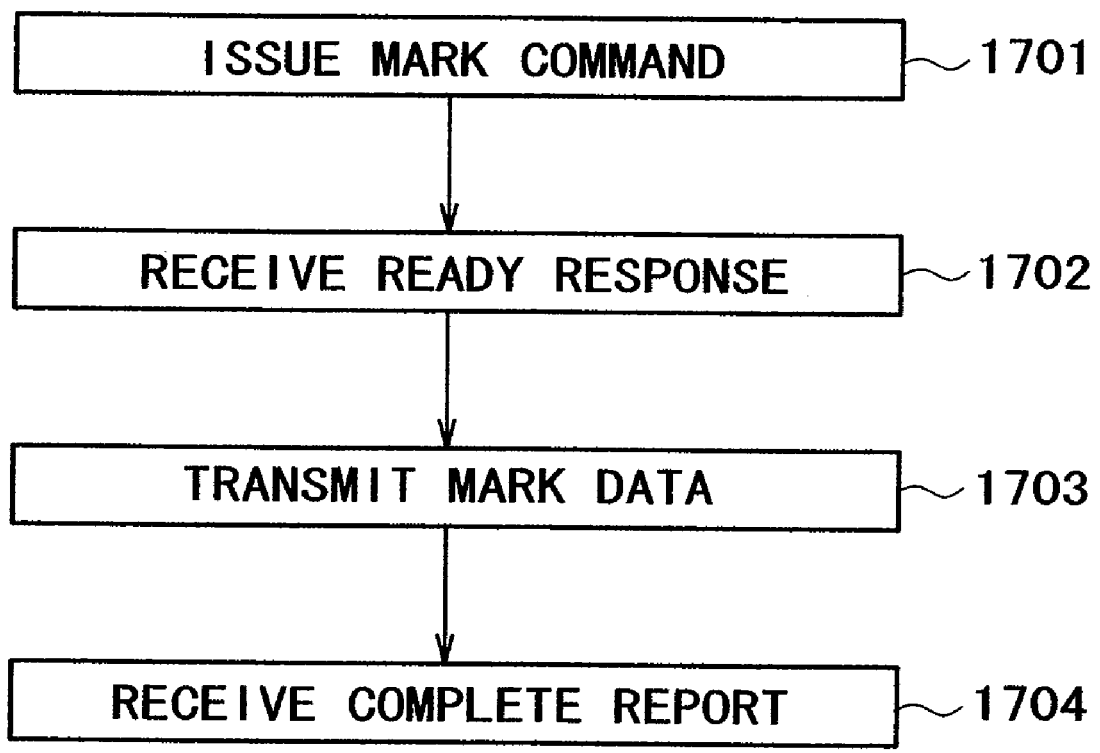
FIG. 18A is a view showing a flowchart (host side) of a mark command processing operation.
Figure 18B:
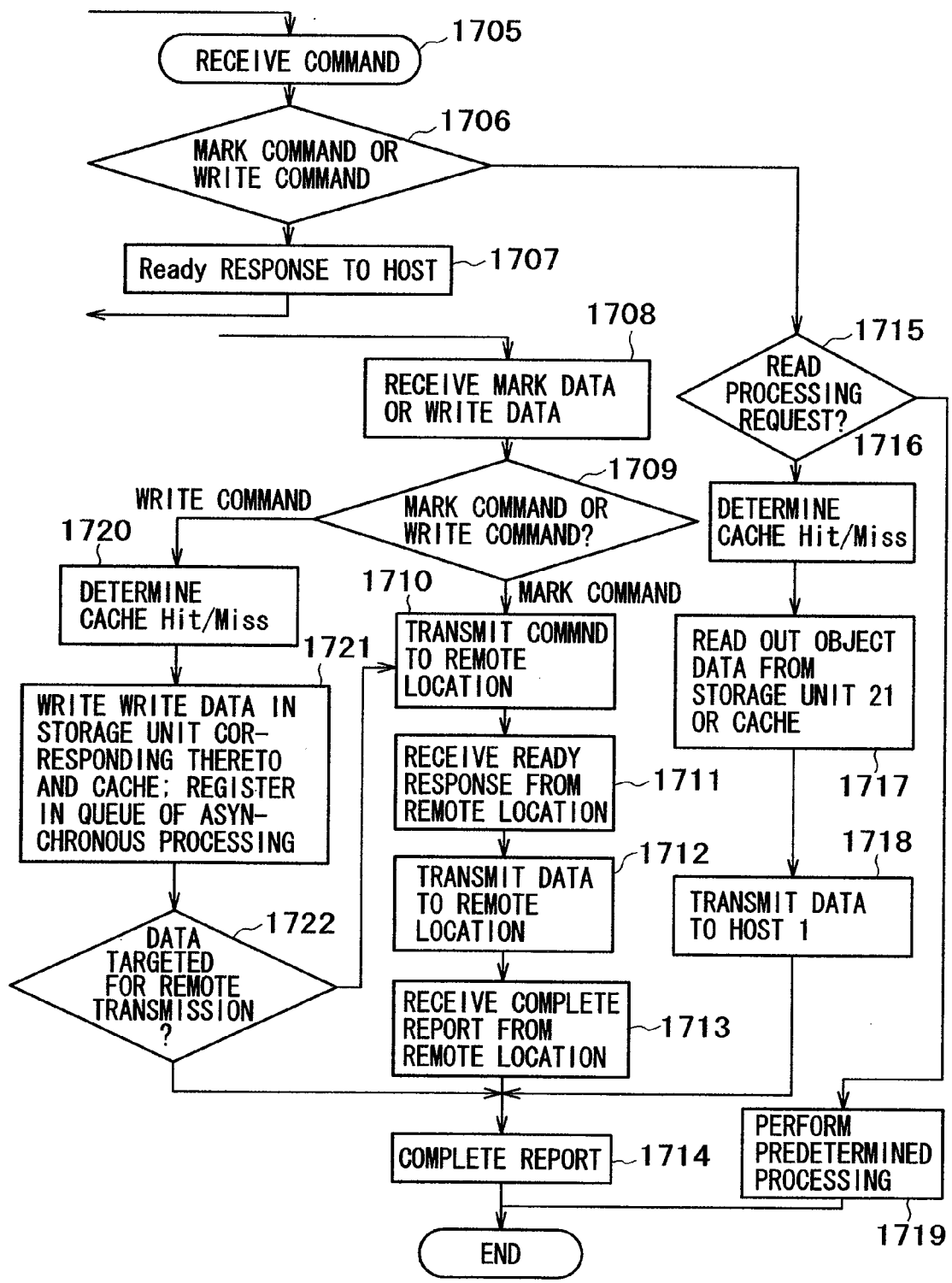
FIG. 18B is a view showing a flowchart (storage system 3 side) of a mark command processing operation.

As shown in FIG. 18A, on the host 1 side, AP or DBMS (Data Base Management System) of the host 1 calls a mark processing program 243 after the file is saved, is closed, and AP is saved, and a process of AP is committed among others to issue a mark command (1701). On issuing the mark command, a mark processing program 243 refers to the mark counter and the timer, and inserts the mark ID and the timer value to create the mark data. Thus, on receipt of a Ready response from the storage system 3 (1702), the mark data will be transmitted to the storage system 3 (1703). Thereafter, on receipt of a report of completion from the storage system 3 after a series of processing are completed, processing of the mark command will be completed (1704).

Next, with reference to FIG. 18B, the description will be made of processing of the MARK command in the storage system 3.

A command processing program 111 of the storage system 3 receives a mark command to be transmitted from the host 1 (1705) to analyze the command (1706). If the command is a mark command as a result of analysis, a Ready response will be returned to the host 1 (1707).

The storage system 3 receives mark data or write data to be transmitted subsequently to the command from the host 1 (1708). Thus, processing responsive to the command received will be performed (1709). In the case of the mark command, the mark command will be transmitted to the remote storage system 4 (1710). Thus, on receipt of a Ready response from the storage system 4 (1711), the mark data will be transmitted to the storage system 4 (1712). After the mark data is transmitted, the mark data will be processed in the storage system 4. After the processing is completed, a report of completion will be transmitted to the storage system 3. On receipt of a report of completion from the remote storage system 4 (1713), the storage system 3 will return a report of mark command processing completed to the host 1 (1714).

When the command received is a read command in the previous determination in the step 1706 (1715), first hit/miss-hit of the cache, that is, the presence or absence of an object address in the cache memory 106 will be determined (1716). Thus, the object data will be read out of the cache memory or the storage unit 21 (1718) to transmit to the host 1 (1718). On the other hand, if it is not the read command, predetermined processing will be performed (1719).

Also, if it is a write command in the determination of the above-described step 1709, hit/miss-hit of the cache is determined (1720), and the write data is written in the storage unit 109 and the cache memory 106 corresponding thereto to be registered in the queue of the asynchronous processing (1721). Thus, it is determined whether or not it is data of a target to be transmitted on the remote side (1722), and if it is data to be transmitted, the procedure will proceed to a step 1710 to perform the subsequent processing. If it is not remote transmission data, a report of completion will be transmitted to the host 1 to complete.

Figure 19:
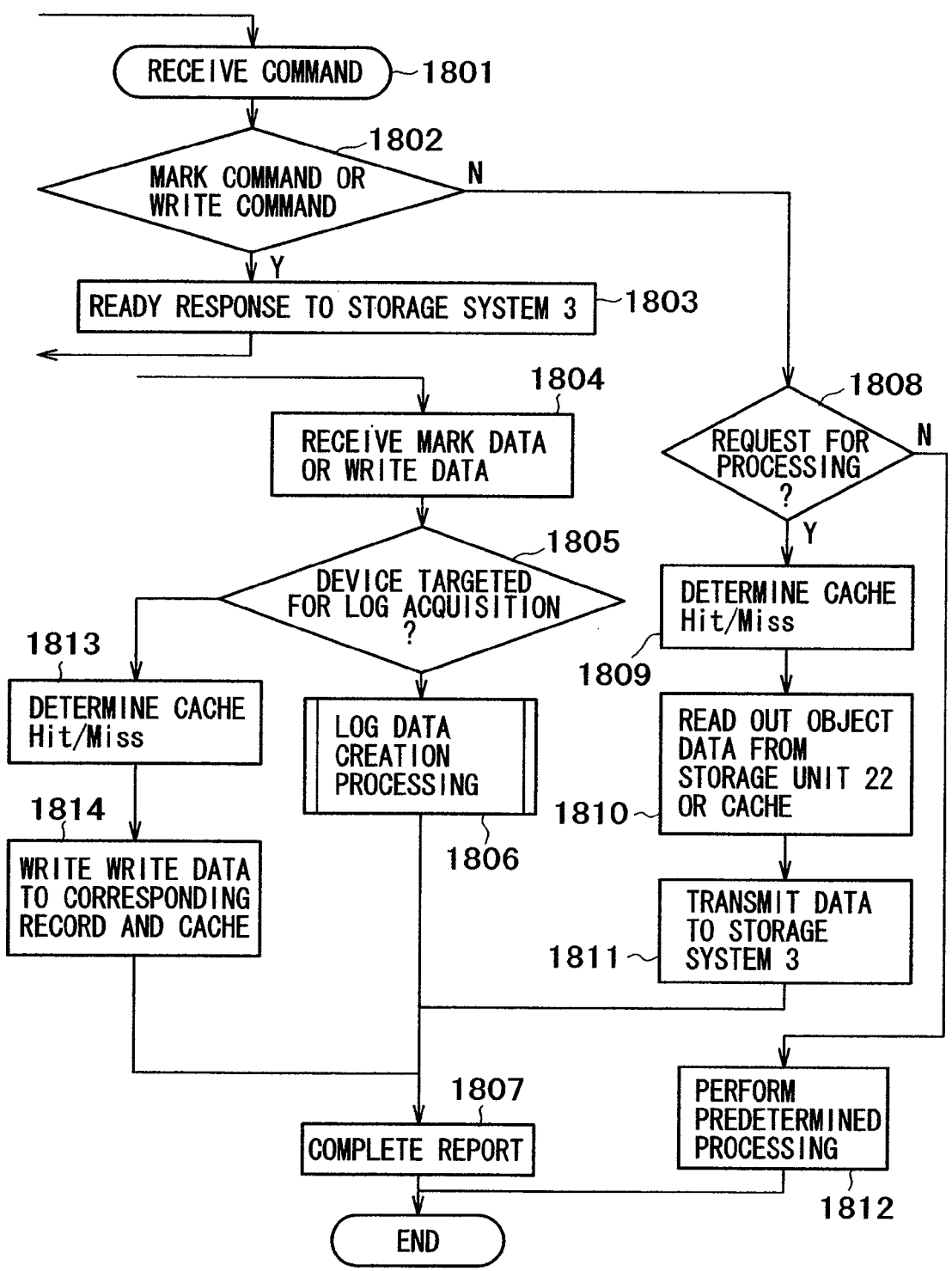
FIG. 19 is a view showing a flowchart for command processing while the log is being acquired at a remote site.

Next, with reference to FIG. 19, the description will be made of command processing during log acquisition in the storage system 4 at the remote site.

On receipt of a command from the storage system 3 (1801), the storage system 4 determines whether it is a mark command or a write command, or out of them (1802). On receipt of the mark command, a Ready response to the mark command will be returned to the storage system 3 (1803).

On receipt of a Ready command from the remote side, the storage system 3 on the master side transmits the mark data to the remote location (1712). On receipt of a mark command (1804), the storage system 4 on the remote side determines whether or not it is a device targeted for log acquisition (logical storage unit) (1805). This determination is performed by referring to tables of volume configuration information 152 on the remote side, pair management information 153, and log volume group configuration information 154 in order. If the target device is a device targeted for log data acquisition as a result of this determination, log data creation processing will be performed (1806). In this respect, the log data creation processing will be described later with reference to FIG. 20. After the completion of creation of log data, a report of completion will be returned o the storage system 3 on the master side (1807).

As a result of determination in a step 1802, on the receipt of the read command, processing (1808 to 1812) of the read command will be performed, and on the receipt of the write command, processing (1813 to 1814) of the write command will be performed. Since the above processing is similar to the operation shown in FIG. 18 described previously, the description will be omitted.

Next, with reference to FIG. 20, the description will be made of log data creation processing in the storage system 4.

In the log data creation processing, an address of log volume is first set by referring to a log ID management information table 157 (1901), and log ID and a timer value are set by referring to the log ID counter 160 and the timer 161 (1902). Thus, an area for storing log data is secured within the cache memory 136 (1903). Thereafter, log data to which log information (including log ID1202, log time 1203 and the like) has been added to the mark data (including mark ID1211, mark time 1212 and the like) as shown in FIG. 13A will be stored in an area of the cache memory 136 (1904). This log data creation processing will be added to asynchronous processing later (1905). In other words, by the execution of the asynchronous storage I/O processing program, the log data stored in the area concerned of the cache memory 136 is stored in the logical storage unit 140 indicated within the storage unit 23. Thereafter, a report of completion will be returned to the storage system 3 to complete.

Figure 21:
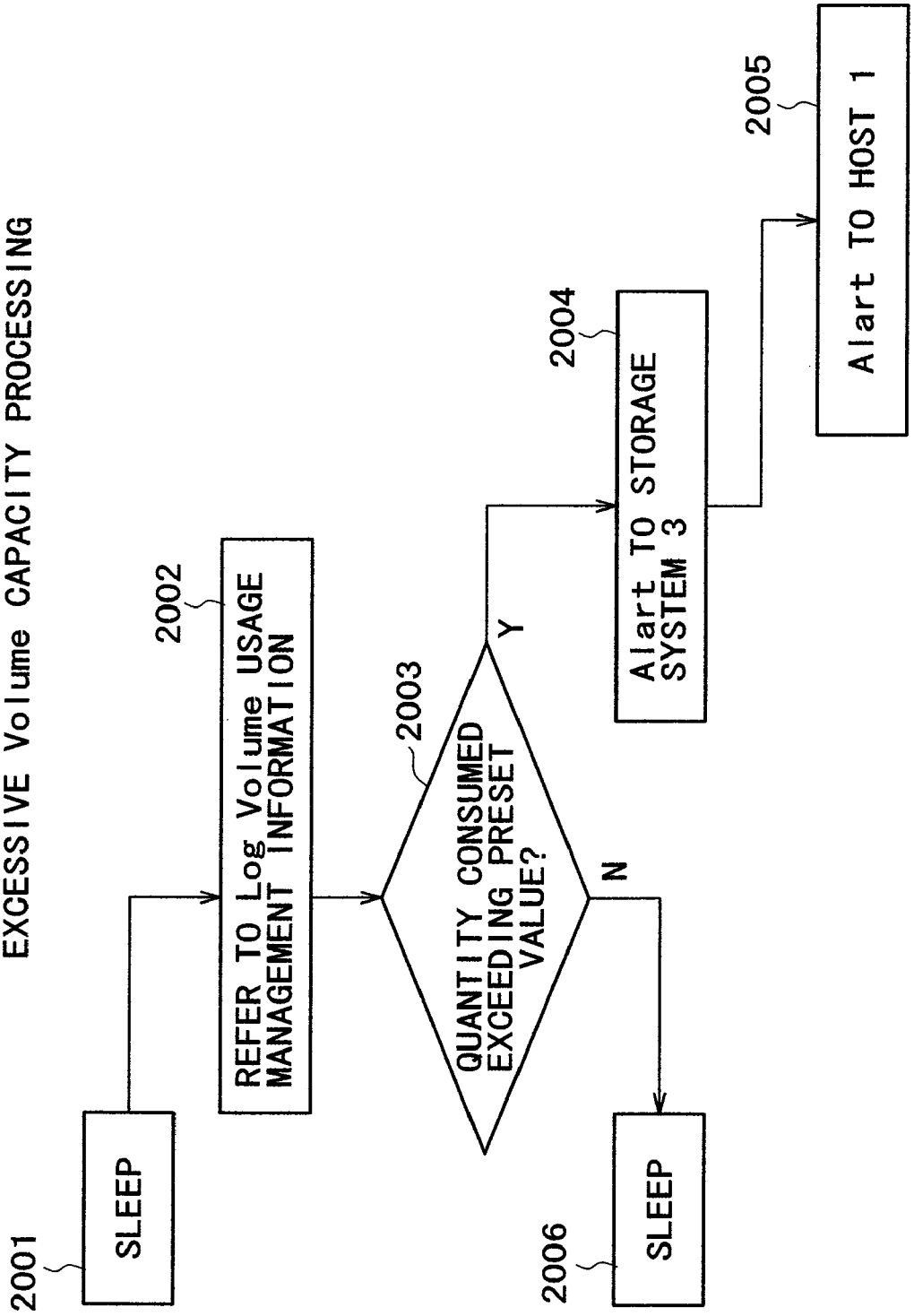
FIG. 21 is a view showing a flowchart for an excessive log volume capacity processing operation.

Next, with reference to FIG. 21, the description will be made of excessive log volume capacity processing.

A log volume group management program 146 monitors quantity consumed of log volume for each log group. When updating due to write I/O or mark I/O occurs, it is reflected on the log volume quantity consumed management information 155 shown in FIG. 10. Further, by referring to the log volume quantity consumed management information 155 reflected at this time (2002), it is confirmed whether or not the quantity consumed of the log volume exceeds a specified value (2003). In this respect, this specified value has been set through the use of the host 1, or a management unit 8, 9 or a computer system management unit 13. As a result of the above-described determination, if the quantity consumed exceeds the specified value, an alert to the effect that the log volume capacity is insufficient will be given to the storage system 3 via the communication channel 6 (2004) will be given.

On receipt of this alert, the storage system 3 returns this alert to the host 1. Or the alert is given to the second storage management unit 4 so as to transmit the alert information to a computer system management unit 13 or the host 1 from the second management unit 9. In this case, the system manager instructs the storage system 4 to reflect the log volume. When giving an instruction from the host 1, an adequate mark ID is instructed by referring to the mark ID management information of the host 1 to reflect the log data within the log volume on R-VOL for avoiding insufficient volume capacity or instructing addition of capacity. On receipt of it, the storage system 4 allocates a free volume which has been registered in volume pool configuration information 156, whereby insufficient volume capacity is avoided.

Figure 22:
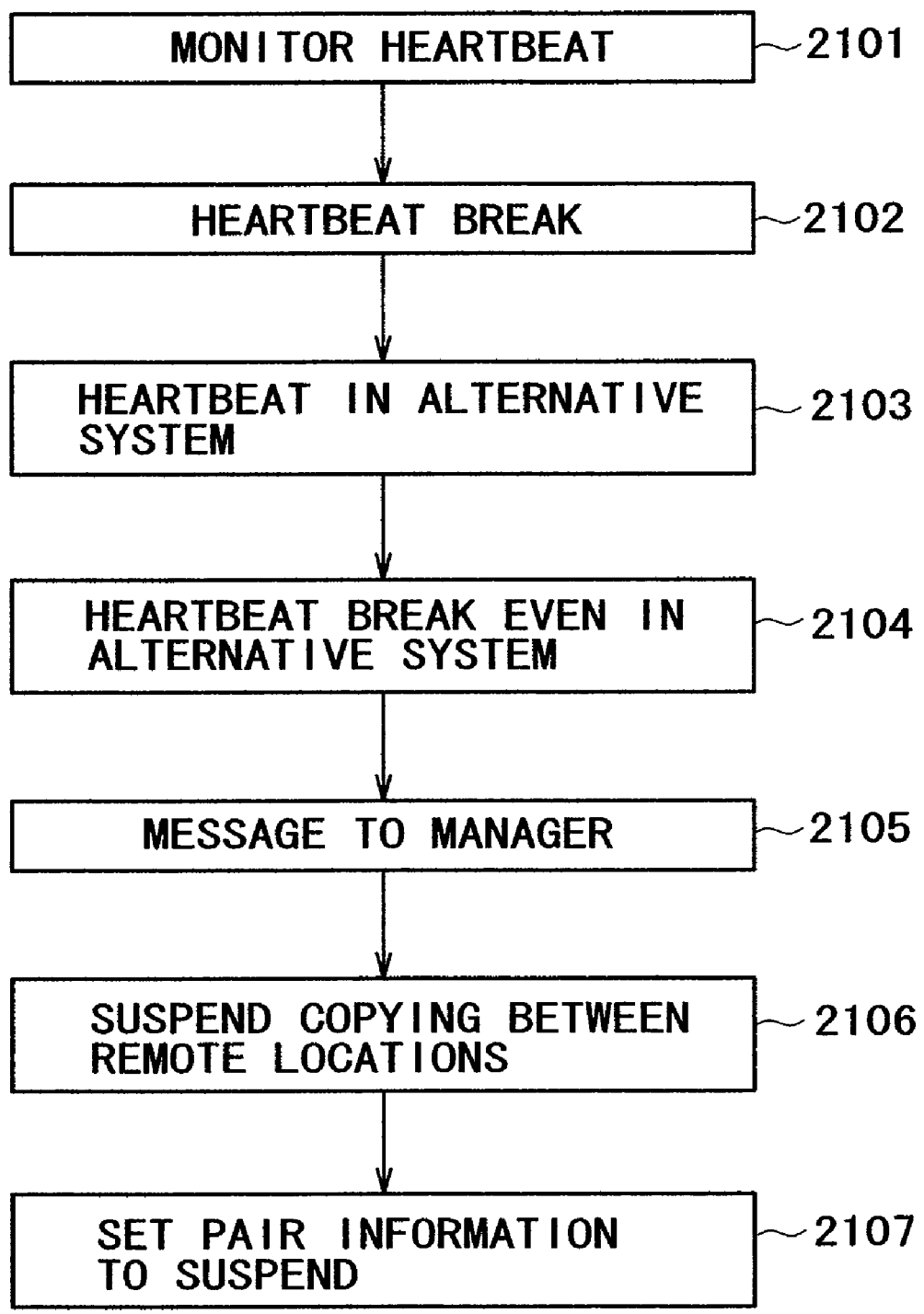
FIG. 22 is a view showing a flowchart for take over processing.

Next, with reference to FIG. 22, the description will be made of take over processing.

This processing is processing to be performed in liaison with the host 1, 2.

First, cluster software of the host 2 monitors heartbeat with cluster software of the host 1 via a communication channel 10 (2101). Specifically, cluster software of the host 1 and the host 2 communicate some data determined at predetermined time intervals with each other and response within a certain time period is expected.

When there are no responses to heartbeats a predetermined number of times in this monitoring, since a failure of the host on the other end or a failure in the network communication channel is supposed, it is determined to be a heartbeat break (2102), and a communication channel of an alternative system will be used to further perform heartbeat (2103). In this respect, the communication channel of the alternative system is preferably separated physically from a communication channel of a normal system in order to exhibit the function normally.

When there is no response even in the communication channel of the alternative system (2104), since there is a possibility that there occurs a trouble on the system manager, an inquiry message for taking over will be given (2104). When some kind of disaster occurs at a certain site and a failure occurs in the host 1, if the host 1 is still in a state capable of performing computer processing, the system manager will use the first cluster software to execute the take over processing. Specifically, a command for suspending all remote pairs of the storage system 3 will be transmitted to the storage system 3 to alternate with the second host in processing of the computer system 4. On this occasion, the application in the course of being processed is suspended and copying processing between remote locations is suspended (2106).

The host 2 transmits a command for performing suspend processing to the storage system 4. Or if heartbeats between the host 2 and the host 1 stop dead for a fixed time period, the system manager of the host 2 will inquire about the system manager of the host 1 to confirm whether or not the host 1 side suffers from a disaster. When it has turned out that it suffered, or when information of the disaster has been known by mass media already, a pair suspend command will be transmitted from the host 2 to the storage system 4 to suspend the pair. Thus, the pair information is set to SUSPEND (2107).

However, there is a possibility that processing for writing error data is performed because a state of the memory for processing information of the host becomes abnormal on account of during the disaster among others. Also in this case, the storage system 3 transmits the data to the storage system 4. Thereafter, the host 1 or 2 will recover the system through the use of the storage system 4.

Figure 23:
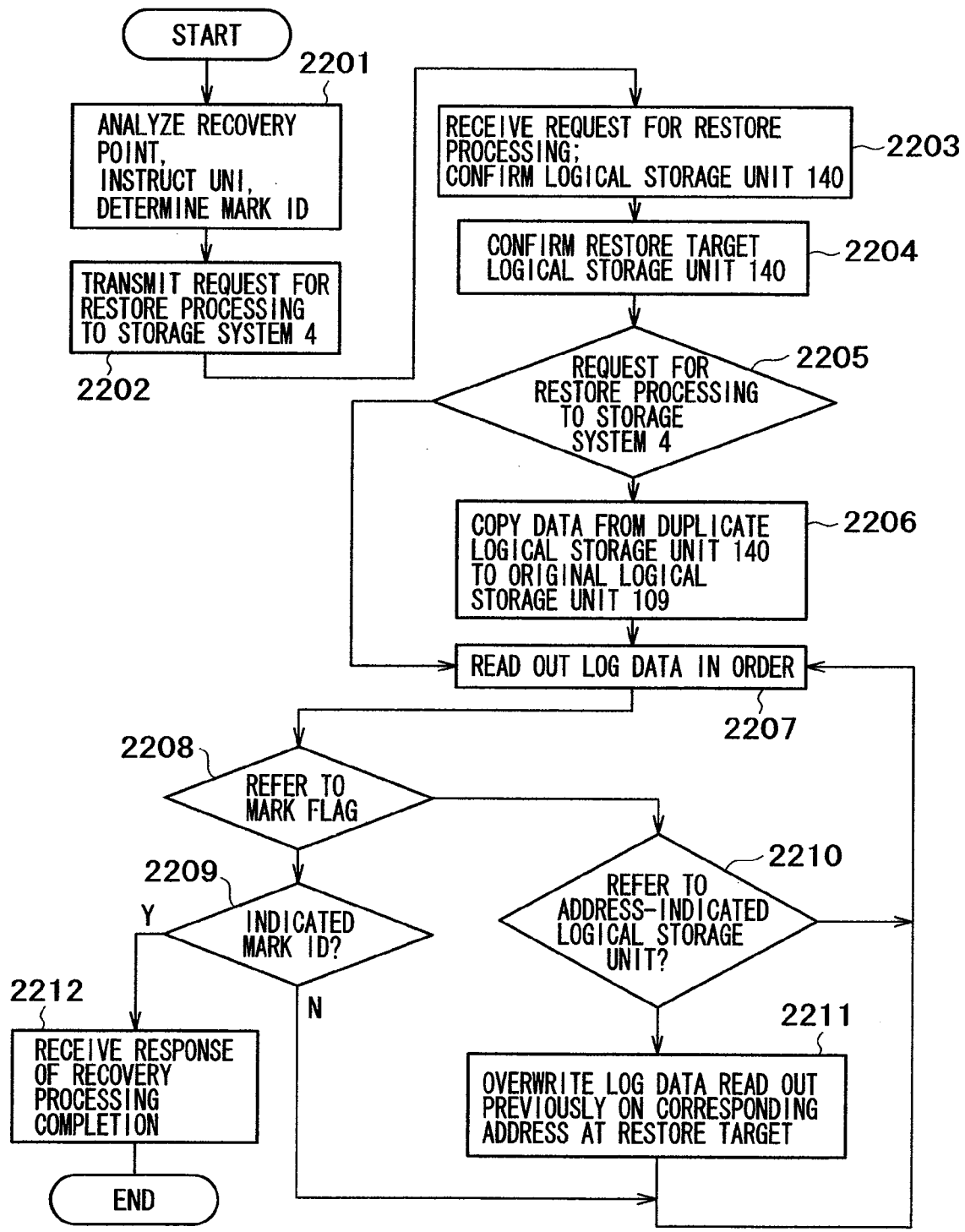
FIG. 23 is a view showing a flowchart for recovery processing.

Next, with reference to FIG. 23, the description will be made of recovery processing.

This recovery processing is processing for data recovery which the storage system 4 receives a recovery and restore instruction from the host 2 for performing. In this respect, the following processing is performed by the storage control unit 131 for executing the copy manager program 144 and the log ID management program (2201).

There is a possibility that the storage system 4 has received, from the storage system 3, data which may probably present an failure such as logical mismatching in the host 2 which performs recovery processing of the host 1. Thus, when performing recovery processing from the host 2, a request for restore processing using an identifier of logical volume to be restored, R-VOL and a mark point will be transmitted from the host 2 to the storage system 4 through the use of R-VOL of the storage system 4 which forms a pair with a storage unit M-VOL of the storage system 3 and data stored in the log logical storage unit 140 (2202).

The host 2 confirms the logical storage unit which receives the request for restore processing (2203). This is performed by transmitting, to the storage system 4, a command for acquiring the mark ID management information to acquire the mark ID management information. The mark ID management information thus acquired is displayed on, for example, a display unit of the host 2 or a display unit of the management unit 9, and a logical storage unit at the restore target is confirmed by the system manager (2204). In other words, the system manager refers to the mark ID management information displayed to determine a recovery point. Thus, the system manager selects a mark ID corresponding thereto to instruct through the use of the host 2 so as to include it in the content of the recovery command for transmitting.

In this case, the system manager of the host 2 is capable of selecting any mark ID from the list of mark ID information instead of the mark ID immediately before the occurrence of failure. Thereby, a system user can select any mark ID to thereby restore the state of R-VOL of the storage system 4 to the point of time whereat the mark ID selected has been created.

The host 2 issues, to the storage system 4, a request for restore processing of log data up to the mark ID selected at the step 2201 (2205). In the request for restore processing which becomes recovery processing, there are included an identifier (such as, for example, WWN and LUN) of R-VOL which becomes a target of processing for reflecting the log data, an identifier for designating a log volume group to which R-VOL belongs, information of a mark ID selected, and the like. The storage control unit 131 of the storage system 4 which has received the request for restore processing issued from the host 2 executes a system configuration information management program 163 and compares the identifier of the log volume to be included in the request for restore processing with the log volume group information to confirm whether or not the designated log volume is a correct log volume for R-VOL (2206).

Further, the storage control unit 131 confirms, from the content of the request for restore processing, whether processing for reflecting the log data is performed on R-VOL, or a different, not-yet-used storage unit 109 is restored. In this respect, if the processing cannot be continued on account of an failure of the storage unit 109, the storage control unit 131 will inform the host 2 to the effect to suspend the processing.

When restoring data in any other storage unit than the storage unit 21, the storage control unit 131 secures a data storing area in the cache memory 136. Thereafter, the storage control unit 131 executes the copy manager program 144 to read out the log data in the area secured in the cache memory 136 in order from the head of the log volume corresponding to R-VOL (2207). On that occasion, it is confirmed whether or not the mark information is included in the log data read out (2208). That is, it is confirmed whether or not a mark flag of the log data has become ON.

When the log data read out is log data including the mark information, the storage control unit 131 confirms whether or not the mark ID to be included in the log data further read out is mark ID designated by the host 2 (2209). When the mark ID to be included in the log data is not the mark ID designated from the host 2, or when no mark ID is stored in the log data (when the mark flag (MF) is not ON), the storage control unit 131 transmits the write data to be included in the log data read out so as to write in R-VOL or an address to which the other storage unit corresponds. On the other hand, in the case of the log data corresponding to the mark ID, the data is not written in because there is no write data existing (2212).

Thereafter, the storage control unit 131 returns to the step 2207 to read out the next log data. Hereinafter, by repeating the processing of 2207 to 2211, the storage control unit 131 restores the log data up to the mark ID designated in an address of the storage unit designated.

In the above-described step 2209, when the mark ID coincides with mark ID designated, the storage control unit 131 determines that all data to be restored has been written in R-VOL or another storage unit 109, and informs the host 2 of the restore processing completed.

On receipt of the report of completion from the storage system 4, the host 2 determines that the data up to the point of time of mark ID designated by the host 2 has been recovered to continue the other processing. On receipt of the response of the recovery processing completed from the host 2 (2212), the storage system 4 completes the processing.

In the foregoing, the description has been made of one embodiment of the present invention, and modification and variation of the present invention in various ways is possible in addition to the above.

For example, in the above-described example, the structure has been arranged such that the log data is stored within the storage system 4 at a remote site. In a variation, however, the log data may be stored not only on the remote site side, but also in a storage unit within the storage system 3 at the master site. In this case, it is apparent that the storage system 3 at the master site has also the program and information provided for the storage system 4 side shown in FIG. 2.

Also, a storage unit which becomes the restore target is not always the storage unit 21 within the storage system 3 at the master site. When the master site is in a disaster-stricken state, there may be used volume 139 within the storage unit 139 which is located within the storage system 4 at a remote site. Or it may be a storage unit within another storage system connected to the network.

Normally, after the log data is restored in the storage unit at the restore target, data that the storage unit at the master site has retained is handled as a restored one, and therefore, the log ID management information 157, the mark ID management information 158, the log data and the like up to the point of time may be discarded. In order to prevent the data from being altered, however, or when there is a regulation that it should be left behind as history for a certain time period, or the like, the above-described management information and log data may be continuously retained as it is.

What is claimed is:

1. A computer system comprising:
   a computer;
   a first storage system, which is coupled to the computer and which receives a write request from the computer; and
   a second storage system which is coupled to the computer and the first storage system;
   wherein the first storage system further comprises:
   a first control unit which processes the write request from the computer;
   a first storage which stores data related to the write request targeted to the first storage from the computer;

a second storage, coupled to the first control unit, which records write data related to the write request targeted to the first storage from the computer with one of time information and sequence number, and a plurality of checkpoints in time for recovery, as log data of the first storage, wherein the checkpoints identify a system state at detections of certain types of transactions, wherein the second storage system further comprises:

a second control unit which processes data from the computer and/or the first storage system;

a third storage which stores data related to the transferred data targeted to the third storage from the first storage system; and a fourth storage, coupled to the second control unit, which records data from the computer with one of time information and sequence number, and a plurality of checkpoints in time for recovery, as log data of the third storage, wherein the checkpoints identify a system state at detections of certain types of transactions.

2. The computer system according to claim 1, wherein the second control unit receives a restoration request including desired checkpoint information specifying one of the plurality of checkpoints, the computer system generates an image of the first storage at a desired point in time specified with desired copied data stored in checkpoint information based upon the fourth storage, and log data which are stored in the fourth storage.

3. The computer system according to claim 1, wherein the second control unit receives a restoration request including desired checkpoint information specifying one of the plurality of checkpoints, the computer system generates an image at a desired point in time specified with the desired checkpoint information based upon the copied data stored in the fourth storage, and log data which are stored in the fourth storage and which are specified by the desired checkpoint and the particular point in time.

4. The computer system according to claim 1, wherein the first control unit receives a restoration request including desired checkpoint information specifying one of the plurality of checkpoints, the computer system generates an image at a desired point in time specified with the desired checkpoint information based upon the copied data stored in the second storage, and log data which are stored in the second storage and which are specified by the desired checkpoint and the particular point in time.

5. The computer system according to claim 1, wherein the computer issues an identifier to the second storage system at a remote site.

6. The computer system according to claim 1, wherein the first storage system further comprises:
a memory for storing management information;
a storage unit including a plurality of logical storage units, wherein the memory further comprises:

a storage management information table for registering a correspondence between an address of the storage unit which the computer is capable of identifying and a logical address within the storage unit and for registering correspondence among a logical address within the storage unit, an address concerning a RAID group in which the logical storage unit has been arranged, and an address concerning a disk for forming the RAID group;

a volume configuration information table for registering volume configuration information correspondingly to a number of the logical storage unit; and a pair management information table for registering a correspondence between number of the logical storage unit within the second storage system.

7. The computer system according to claim 1, wherein when the log data stored in the logical storage unit in the second storage system is restored to a state at any given time, the second storage system receives a request for restoring data transmitted from the computer, and restores the log data stored in the logical storage unit by referring to the management information stored in the memory concerning the identification information.

8. The computer system according to claim 6, wherein at least the second storage system has:
a log volume group information table which registers management information concerning a logical storage unit within the log volume group for each log volume group;
a log ID management information table for bringing a log ID to be imparted when the log data is stored in the logical storage unit into correspondence to a timer value when the log data has been acquired to register as management information; and
a mark ID management information table for bringing identification information to be imparted when the log data is stored in the logical storage unit, which has been transmitted from the computer, into correspondence to a timer value when the log data is stored to register as management information.

9. The computer system according to claim 1, wherein in the first storage system, the command processing program processes a command to be transmitted from the computer, and when the command is a mark command, creates log data and performs processing for imparting the identification information, and
in the case of an I/O processing command, the command processing program determines a hit or a miss-hit of the cache memory, writes write data in the cache memory, or reads out read data from the cache memory.

10. The computer system according to claim 1, wherein on receipt of the mark command issued by the computer, the second storage system confirms a storage unit which acquires the log data, and sets correspondence between the log data thus acquired and mark ID and mark data including timer values.

* * * * *